(12) United States Patent
Ke

(10) Patent No.: US 12,245,126 B2
(45) Date of Patent: *Mar. 4, 2025

(54) SERVICE PROCESSING METHOD, INFORMATION TRANSMISSION METHOD, AND RELEVANT DEVICES

(71) Applicant: VIVO MOBILE COMMUNICATION CO., LTD., Guangdong (CN)

(72) Inventor: Xiaowan Ke, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/488,563

(22) Filed: Oct. 17, 2023

(65) Prior Publication Data

US 2024/0064579 A1 Feb. 22, 2024

Related U.S. Application Data

(63) Continuation of application No. 16/969,910, filed as application No. PCT/CN2019/074976 on Feb. 13, 2019, now Pat. No. 11,832,133.

(30) Foreign Application Priority Data

Feb. 13, 2018 (CN) .......................... 201810151030.0

(51) Int. Cl.
*H04W 4/90* (2018.01)
*H04L 61/5007* (2022.01)
(Continued)

(52) U.S. Cl.
CPC ........... *H04W 4/90* (2018.02); *H04L 61/5007* (2022.05); *H04L 65/1016* (2013.01); *H04W 60/00* (2013.01)

(58) Field of Classification Search
CPC ............. H04W 36/14; H04W 36/0016; H04W 36/0022; H04W 60/00; H04W 92/02;
(Continued)

(56) References Cited

U.S. PATENT DOCUMENTS 10,390,263 B2   8/2019  Chen et al.
10,524,198 B2 * 12/2019 Shan ...................... H04W 48/16
(Continued)

FOREIGN PATENT DOCUMENTS

CN      101026800 A      8/2007
CN      101159901 A      4/2008
(Continued)

OTHER PUBLICATIONS

Liu Ye., "Research on key technologies of P2P networks adapted to self-organizing management mode," Department of Computer Science and Engineering, Southeast University, (Apr. 2006).
(Continued)

Primary Examiner — Matthew C Sams
(74) Attorney, Agent, or Firm — BROOKS KUSHMAN P.C.

(57) ABSTRACT

The present disclosure provides a service processing method, an information transmission method and relevant devices. The service processing method includes: acquiring related information about service processing; and performing relevant processing on a target service at least in accordance with the acquired related information about the service processing.

20 Claims, 7 Drawing Sheets

(51) Int. Cl.
  *H04L 65/1016*   (2022.01)
  *H04W 60/00*    (2009.01)
(58) Field of Classification Search
  CPC ............... H04W 12/72; H04W 36/00; H04W 36/0033; H04W 36/0066; H04W 36/305; H04W 36/34; H04W 60/04; H04W 60/06; H04W 76/18; H04W 8/02; H04W 4/90; H04W 36/385; H04L 61/2007; H04L 65/1016
  See application file for complete search history.

(56) References Cited

U.S. PATENT DOCUMENTS

| | | | |
|---|---|---|---|
| 11,032,369 B1 | 6/2021 | Wei | |
| 11,102,614 B2 | 8/2021 | Jeong et al. | |
| 11,832,133 B2* | 11/2023 | Ke | H04L 65/1095 |
| 2010/0040024 A1 | 2/2010 | Wu | |
| 2011/0090873 A1 | 4/2011 | Lee et al. | |
| 2011/0119398 A1 | 5/2011 | Foote et al. | |
| 2011/0274087 A1 | 11/2011 | Liang et al. | |
| 2013/0031271 A1 | 1/2013 | Bosch et al. | |
| 2014/0056224 A1 | 2/2014 | Rubin et al. | |
| 2014/0185516 A1 | 7/2014 | Rubin et al. | |
| 2014/0362822 A1 | 12/2014 | Tseng et al. | |
| 2015/0271661 A1 | 9/2015 | Shang et al. | |
| 2015/0358477 A1 | 12/2015 | Jeong et al. | |
| 2016/0100338 A1 | 4/2016 | Wu et al. | |
| 2018/0085187 A1 | 3/2018 | Dor et al. | |
| 2018/0376384 A1 | 12/2018 | Youn et al. | |
| 2019/0124561 A1* | 4/2019 | Faccin | H04W 36/0022 |
| 2019/0191349 A1 | 6/2019 | Kim et al. | |
| 2019/0306847 A1 | 10/2019 | Seo et al. | |
| 2020/0275331 A1 | 8/2020 | Kim et al. | |
| 2020/0351721 A1* | 11/2020 | Liu | H04W 36/38 |
| 2020/0351742 A1 | 11/2020 | Liu et al. | |

FOREIGN PATENT DOCUMENTS

| | | | | |
|---|---|---|---|---|
| CN | 101888596 | A | 11/2010 | |
| CN | 102271386 | A | 12/2011 | |
| CN | 102857891 | A | 1/2013 | |
| CN | 102904791 | A | 1/2013 | |
| CN | 104618976 | A | 5/2015 | |
| CN | 106658714 | A | 5/2017 | |
| EP | 2 229 025 | A1 | 9/2010 | |
| EP | 3 096 583 | A1 | 11/2016 | |
| EP | 3547739 | A1 * | 10/2019 | H04L 63/083 |
| JP | 2011-529642 | A | 12/2011 | |
| JP | 2016-521941 | A | 7/2016 | |
| WO | 2018/085187 | A1 | 5/2018 | |
| WO | WO-2018128529 | A1 * | 7/2018 | H04W 12/72 |
| WO | 2019/140560 | A1 | 7/2019 | |

OTHER PUBLICATIONS

"3rd Generation Partnership Project; Technical Specification Group Core Network and Terminals; Non-Access-Stratum (NAS) protocol for Evolved Packet System (EPS); Stage 3 (Release 12)," 3GPP TS 24.301 V12.12.0, pp. 1-383, (Mar. 2016).

Motorola Mobility, et al., "OI#11—EPC fallback and handling of 5GC services in DR-mode of operation," SA WG2 Meeting #123, S2-177484 (revision of S2-17xxxx), pp. 1-4, (Oct. 23-27, 2017).
Motorola Mobility, et al. "OI#11—EPC fallback and handling of 5GC services in DR-mode of operation," SA WG2 Meeting #123, S2-177679, pp. 1-3, (Oct. 23-27, 2017).
ZTE, et al., "TS 23.502: pCR on EPS fallback for EMC service and IMS normal service without N26," SA WG2 Meeting #124, S2-178746 (revision of S2-17xxxx), pp. 1-5, (Nov. 27-Dec. 1, 2017).
Motorola Mobility, et al. "Service fallback in DR-mode of operation," SA WG2 Meeting #124, S2-178893 (revision of S2-17xxxx), pp. 1-3, (Nov. 27-Dec. 1, 2017).
Intel., "EPS fallback for voice," SA WG2 Meeting #125, S2-180235, (Jan. 22-26, 2018).
ZTE, et al., "23.502 RRC release with redirection for voice," 3GPP TSG-SA WG2 Meeting #125, S2-180554 (revision of S2-18xxxx), (Jan. 22-26, 2018).
ZTE., "Clarification on the Emergency HO indication for EPS fallback," 3GPP TSG-SA WG2 Meeting #125, S2-180555 (revision of S2-18xxxx), (Jan. 22-26, 2018).
Orange., "Clarification on the use of the indicator for the support of interworking without N26 and interworking with N26," 3GPP TSG-SA WG2 Meeting #125, S2-180793 (rev of 180165), (Jan. 22-26, 2018).
International Search Report and Written Opinion of the International Searching Authority dated Apr. 17, 2019 as received in Application No. PCT/CN2019/074976.
CN First Office Action dated Apr. 20, 2020 as received in Application No. 201810151030.0.
Extended European Search Report dated Mar. 4, 2021 as received in Application No. 19754741.7.
CN Third Office Action dated Jun. 15, 2021 as received in Application No. 201810151030.0.
IN Patent Examination Report dated Jun. 30, 2021 as received in Application No. 202027038696.
KR Office Action dated Aug. 5, 2021 as received in Application No. 10-2020-7024752.
US First Office Action dated Sep. 20, 2021 as received in U.S. Appl. No. 16/969,910.
JP First Office Action dated Oct. 4, 2021 as received in Application No. 2020-543299.
KR Decision to Grant Dated Nov. 1, 2021 as received in Application No. 10-2020-7024752.
JP Second Office Action dated Mar. 7, 2022 as received in Application No. 2020-543299.
JP Third Office Action dated Aug. 8, 2022 as received in Application No. 2020-543299.
US Second Office Action dated Oct. 5, 2022 as received in U.S. Appl. No. 16/969,910.
US Third Office Action dated Feb. 2, 2023 as received in U.S. Appl. No. 16/969,910.
First Office Action for Japanese Application No. 2022-196427, dated Nov. 16, 2023, 4 Pages.
Nokia, Nokia Shanghai Bell, MediaTek Inc. "Mode selection for inter-system change between EPS and 5GS" 3GPP TSG-CT WG1 Meeting #108, Gothenburg, Sweden, Jan. 2018, C1-180745, 17 Pages.
Second Office Action for Indian Application No. 202027038696, dated May 9, 2024, 3 Pages.

* cited by examiner

SERVICE PROCESSING METHOD, INFORMATION TRANSMISSION METHOD, AND RELEVANT DEVICES

CROSS-REFERENCE TO RELATED APPLICATION

The present application claims the benefit of and is a continuation application of U.S. patent application Ser. No. 16/969,910 filed on Aug. 13, 2020, which is the U.S. national phase of PCT Application PCT/CN2019/074976 filed on Feb. 13, 2019, which claims priority to Chinese patent application No. 201810151030.0 filed on Feb. 13, 2018, which are incorporated herein by reference in their entirety.

TECHNICAL FIELD

The present disclosure relates to the field of mobile communications technology, in particular to a service processing method for Internet interworking, an information transmission method, and relevant devices.

BACKGROUND

When a 5th-generation (5th-Generation, 5G) network does not directly support to provide, or does not directly provide, an IP multimedia subsystem (IP Multimedia Subsystem, IMS) voice service/emergency service in the 5G network but an evolved packet system (Evolved Packet System EPS) supports the IMS voice service/emergency service, the 5G network may still transmit a voice service support indicator to a user equipment (User Equipment, UE).

Upon the receipt of the voice service support indicator/the emergency service, the UE may initiate the establishment of a voice service/emergency service-related session at the 5G network. After the 5G network has received information indicating that a quality of service (Quality of Service, QoS) flow for the voice service is established, the UE may fall back to an EPS network to support the voice service. However, this fallback procedure may lead to call drop. For example, when there is no N26 interface between the 5G network and the EPS network (an interface between an access management function (Access Management Function, AMF) and a mobility management entity (Mobility Management Entity, MME)), the UE may fall back in a re-directed manner. When the UE does not support indicating handover, it is impossible to ensure the preservation of an IP address of the UE, and thereby it is impossible for the UE to execute the service.

SUMMARY

An object of the present disclosure is to provide a service processing method, an information transmission method and relevant devices, so as to enable a terminal to initiate or receive a voice service and/or an emergency service.

In one aspect, the present disclosure provides in some embodiments a service processing method for a network unit in a first network, including: acquiring related information about service processing, the related information about the service processing including at least one of related information indicating whether a terminal supports a request for preservation of an IP address of the terminal, related information indicating whether the first network and/or a second network supports preservation of an IP address of the terminal, related information indicating whether the first network and/or the second network supports a procedure of interworking with an N26 interface, related information indicating whether the first network and/or the second network supports a procedure of interworking without an N26 interface, related information indicating whether the terminal supports indicating handover, related information indicating whether the first network and/or the second network supports preservation of an IP address of the terminal in accordance with the terminal indicating handover, related information about a terminal type, related information about a registration mode of the terminal, related information indicating whether the terminal supports to be re-directed to the second network, related information indicating whether the first network and/or the second network support a target service, related information indicating whether the first network supports to re-direct the terminal to the second network, related information indicating whether the first network supports the target service through re-directing the terminal to the second network; and performing relevant processing on the target service at least in accordance with the acquired related information about the service processing, the relevant processing on the target service being relevant processing about service support indication.

In another aspect, the present disclosure provides in some embodiments a service processing method for a terminal, including: acquiring related information about service processing, the related information about the service processing including at least one of related information indicating whether the terminal supports a request for preservation of an IP address of the terminal, related information indicating whether the first network and/or a second network supports preservation of an IP address of the terminal, related information indicating whether the first network and/or the second network supports a procedure of interworking with an N26 interface, related information indicating whether the first network and/or the second network supports a procedure of interworking without an N26 interface, related information indicating whether the terminal supports indicating handover, related information indicating whether the first network and/or the second network supports preservation of an IP address of the terminal in accordance with the terminal indicating handover, related information about a terminal type, related information about a registration mode of the terminal, related information indicating whether the terminal supports to be re-directed to the second network, related information indicating whether the first network and/or the second network support a target service, related information indicating whether the first network supports to re-direct the terminal to the second network, related information indicating whether the first network supports the target service through re-directing the terminal to the second network; and performing relevant processing on the target service at least in accordance with the acquired related information about the service processing, the relevant processing on the target service being relevant processing about access zone selection.

In yet another aspect, the present disclosure provides in some embodiments a service processing method for a network unit in a first network, including: acquiring related information about service processing, the related information about the service processing including at least one of related information indicating whether a terminal supports a request for preservation of an IP address of the terminal, related information indicating whether the first network and/or a second network supports preservation of an IP address of the terminal, related information indicating whether the first network and/or the second network supports a procedure of interworking with an N26 interface, related information indicating whether the first network and/or the second network supports a procedure of interworking without an N26 interface, related information indicating whether the terminal supports indicating handover, related information indicating whether the first network and/or the second network supports preservation of an IP address of the terminal in accordance with the terminal indicating handover, related information about a terminal type, related information about a registration mode of the terminal, related information indicating whether the terminal supports to be re-directed to the second network, related information indicating whether the first network and/or the second network support a target service, related information indicating whether the first network supports to re-direct the terminal to the second network, related information indicating whether the first network supports the target service through re-directing the terminal to the second network; and performing relevant processing on the target service at least in accordance with the acquired related information about the service processing, the relevant processing on the target service being relevant processing about re-direction.

In still yet another aspect, the present disclosure provides in some embodiments an information transmission method, including transmitting related information about service processing, so as to perform relevant processing about service support indication for a target service, relevant processing about access zone selection, or relevant processing about re-direction for the target service. The related information about the service processing includes at least one of related information indicating whether a terminal supports a request for preservation of an IP address of the terminal, related information indicating whether the first network and/or a second network supports preservation of an IP address of the terminal, related information indicating whether the first network and/or the second network supports a procedure of interworking with an N26 interface, related information indicating whether the first network and/or the second network supports a procedure of interworking without an N26 interface, related information indicating whether the terminal supports indicating handover, related information indicating whether the first network and/or the second network supports preservation of an IP address of the terminal in accordance with the terminal indicating handover, related information about a terminal type, related information about a registration mode of the terminal, related information indicating whether the terminal supports to be re-directed to the second network, related information indicating whether the first network and/or the second network support a target service, related information indicating whether the first network supports to re-direct the terminal to the second network, related information indicating whether the first network supports the target service through re-directing the terminal to the second network.

In still yet another aspect, the present disclosure provides in some embodiments a communication device, including: an acquisition module configured to acquire related information about service processing, the related information about the service processing including at least one of related information indicating whether a terminal supports a request for preservation of an IP address of the terminal, related information indicating whether the first network and/or a second network supports preservation of an IP address of the terminal, related information indicating whether the first network and/or the second network supports a procedure of interworking with an N26 interface, related information indicating whether the first network and/or the second network supports a procedure of interworking without an N26 interface, related information indicating whether the terminal supports indicating handover, related information indicating whether the first network and/or the second network supports preservation of an IP address of the terminal in accordance with the terminal indicating handover, related information about a terminal type, related information about a registration mode of the terminal, related information indicating whether the terminal supports to be re-directed to the second network, related information indicating whether the first network and/or the second network support a target service, related information indicating whether the first network supports to re-direct the terminal to the second network, related information indicating whether the first network supports the target service through re-directing the terminal to the second network; and a processing module configured to perform relevant processing on the target service at least in accordance with the acquired related information about the service processing, the relevant processing on the target service being relevant processing about service support indication.

In still yet another aspect, the present disclosure provides in some embodiments a communication device, including: an acquisition module configured to acquire related information about service processing, the related information about the service processing including at least one of related information indicating whether a terminal supports a request for preservation of an IP address of the terminal, related information indicating whether the first network and/or a second network supports preservation of an IP address of the terminal, related information indicating whether the first network and/or the second network supports a procedure of interworking with an N26 interface, related information indicating whether the first network and/or the second network supports a procedure of interworking without an N26 interface, related information indicating whether the terminal supports indicating handover, related information indicating whether the first network and/or the second network supports preservation of an IP address of the terminal in accordance with the terminal indicating handover, related information about a terminal type, related information about a registration mode of the terminal, related information indicating whether the terminal supports to be re-directed to the second network, related information indicating whether the first network and/or the second network support a target service, related information indicating whether the first network supports to re-direct the terminal to the second network, related information indicating whether the first network supports the target service through re-directing the terminal to the second network; and a processing module configured to perform relevant processing on the target service at least in accordance with the acquired related information about the service processing, the relevant processing on the target service being relevant processing about access zone selection.

In still yet another aspect, the present disclosure provides in some embodiments a communication device, including: an acquisition module configured to acquire related information about service processing, the related information about the service processing including at least one of related information indicating whether a terminal supports a request for preservation of an IP address of the terminal, related information indicating whether the first network and/or a second network supports preservation of an IP address of the terminal, related information indicating whether the first network and/or the second network supports a procedure of interworking with an N26 interface, related information indicating whether the first network and/or the second network supports a procedure of interworking without an N26 interface, related information indicating whether the terminal supports indicating handover, related information indicating whether the first network and/or the second network supports preservation of an IP address of the terminal in accordance with the terminal indicating handover, related information about a terminal type, related information about a registration mode of the terminal, related information indicating whether the terminal supports to be re-directed to the second network, related information indicating whether the first network and/or the second network support a target service, related information indicating whether the first network supports to re-direct the terminal to the second network, related information indicating whether the first network supports the target service through re-directing the terminal to the second network; and a processing module configured to perform relevant processing on the target service at least in accordance with the acquired related information about the service processing, the relevant processing on the target service being relevant processing about re-direction.

In still yet another aspect, the present disclosure provides in some embodiments a communication device, including a transmission module configured to transmit or broadcast related information about service processing, so as to perform relevant processing about service support indication for a target service, relevant processing about access zone selection, or relevant processing about re-direction for the target service. The related information about the service processing includes at least one of related information indicating whether a terminal supports a request for preservation of an IP address of the terminal, related information indicating whether the first network and/or a second network supports preservation of an IP address of the terminal, related information indicating whether the first network and/or the second network supports a procedure of interworking with an N26 interface, related information indicating whether the first network and/or the second network supports a procedure of interworking without an N26 interface, related information indicating whether the terminal supports indicating handover, related information indicating whether the first network and/or the second network supports preservation of an IP address of the terminal in accordance with the terminal indicating handover, related information about a terminal type, related information about a registration mode of the terminal, related information indicating whether the terminal supports to be re-directed to the second network, related information indicating whether the first network and/or the second network support a target service, related information indicating whether the first network supports to re-direct the terminal to the second network, related information indicating whether the first network supports the target service through re-directing the terminal to the second network.

In still yet another aspect, the present disclosure provides in some embodiments a communication device, including a processor, a memory, and a computer program stored in the memory and executed by the processor. The processor is configured to execute the computer program so as to implement the above-mentioned service processing methods.

In still yet another aspect, the present disclosure provides in some embodiments a communication device, including a processor, a memory, and a computer program stored in the memory and executed by the processor. The processor is configured to execute the computer program so as to implement the above-mentioned information transmission method.

In still yet another aspect, the present disclosure provides in some embodiments a computer-readable storage medium storing therein a computer program. The computer program is executed by a processor, so as to implement the above-mentioned service processing methods or the above-mentioned information transmission method.

According to the embodiments of the present disclosure, the related information about the service processing may be acquired, and the relevant processing on the target service may be performed at least in accordance with the acquired related information about the service processing. As a result, it is able for the terminal to initiate or receive a voice service and/or an emergency service.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Figure 1:
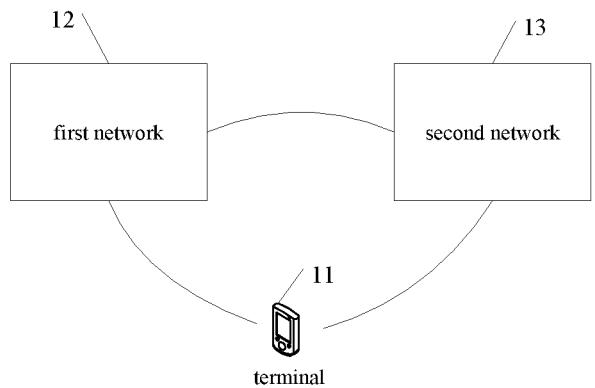
FIG. 1 is a schematic view showing an applicable environment according to one embodiment of the present disclosure.

As shown in FIG. 1, which shows an applicable environment according to one embodiment of the present disclosure, the applicable environment includes a terminal 11, a first network 12 and a second network 13.

The terminal 11 may be a user equipment (User Equipment, UE), e.g., a terminal side device such as mobile phone, tablet personal computer, laptop computer, personal digital assistant (Personal Digital Assistant, PDA), mobile Internet device (Mobile Internet Device, MID) or wearable device. It should be appreciated that, a specific type of the terminal 11 will not be particularly defined herein.

A network unit of the first network 12 or the second network 13 may be any network side device or network function. For example, the network unit may be a network unit of a wireless access network or a core network. In addition, the network unit of the first network 12 may interact with the terminal 11 or the other network unit. The second network 13 may be any other network different from the first network 12.

In the embodiments of the present disclosure, the network unit of the core network may include at least one of a core network device, a core network node, a core network function, a core network unit, an MME, an AMF, a session management function (Session Management Function (SMF), a user plane function (User Plane Function, UPF), a serving GW (SGW), a PDN gate way, a policy control function (Policy Control Function, PCF), a policy and charging rules function (Policy and Charging Rules Function, PCRF), a serving GPRS support node (Serving GPRS Support Node, SGSN), and a gateway GRPS support node (Gateway GPRS Support Node, GGSN).

In the embodiments of the present disclosure, the network unit of the wireless access network may include at least one of a wireless access network device, a wireless access network node, a wireless access network function, a wireless access network unit, a 3GPP wireless access network, a non-3GPP wireless access network, a centralized unit (Centralized Unit, CU), a distributed unit (Distributed Unit, DU), a base station, an evolved node B (evolved Node B, eNB), a 5G base station (gNB), a radio network controller (Radio Network Controller, RNC), a node B (NodeB), a non-3GPP interworking function (Non-3GPP Inter-Working Function, N3IWF), an access controller (Access Controller, AC) node, an access point (Access Point, AP) device, and a wireless local area networks (Wireless Local Area Networks, WLAN) node.

The base station may be a base transceiver station (Base Transceiver Station, BTS) in GSM or CDMA, a base station (NodeB) in WCDMA, an evolutional Node B (eNB or e-NodeB) in LTE, or a 5G base station (gNB), which will not be particularly defined herein.

For a 5G network that supports the interworking with an EPC, the preservation of an IP address may be provided for the terminal through supporting a procedure of interworking with an N26 interface or supporting a procedure of interworking without an N26 interface. In some embodiments of the present disclosure, the preservation of the IP address may be called as keeping the IP address unchanged.

When the network supports a procedure of interworking without an N26 interface, in order to support the preservation of the IP address, it is necessary for the terminal to indicate a request type as handover in a protocol data unit (Protocol Data Unit, PDU) connection establishment request in the case of accessing a target network. Currently, the terminal may support to indicate the request type as handover in an attachment request or the PDU connection establishment request. Here, the PDU connection establishment request may be a PDU connection establishment request in a PDU connection establishment request message for an attachment request message.

In the embodiments of the present disclosure, eLTE is a mode where EUTRA is directly connected to 5GC, and the EPS may also be called as LTE.

In the embodiments of the present disclosure, an emergency service may also be called as one of emergency voice service and emergency IMS voice service. Emergency service support indication information may be one of emergency services support indicator, and emergency services support using fallback.

In the embodiments of the present disclosure, a voice service may also be called as an IMS voice service over PS session. A voice service support indicator may be one of an IMS voice over PS session supported indicator, and an IMS voice over PS session supported indicator over 3GPP.

In the embodiments of the present disclosure, for the 5G network that supports the interworking with the EPC, it may support a procedure of interworking with an N26 interface a procedure of interworking with an N26 interface or support a procedure of interworking without an N26 interface.

In the embodiments of the present disclosure, when the network supports a procedure of interworking with an N26 interface, it means that, when the terminal supports 5GC NAS and EPS NAS moves between the 5G network and an EPS network, a procedure of interworking with an N26 interface may support to provide the preservation of the IP address (i.e., keep the IP address unchanged) for the terminal.

In the embodiments of the present disclosure, when the network supports a procedure of interworking without an N26 interface, it means that the preservation of the IP address may also be provided for the terminal through a specific network configuration (e.g., in the first network, after a PDU session/PDU connection has been established, PGW+SMF (for both the first network and the second network) may store information about the PGW+SMF as well as DNN/APN information in HSS+UDM (for both the first network and the second network), and after the UE has accessed the second network, the second network may acquire the information about the PGW+SMF as well as the DNN/APN information from the HSS+UDM).

However, the terminal in a dual-registration mode may support to indicate the request type as handover in the PDU connection request, but the terminal in a single-registration mode may, or may not, support to indicate the request type as handover in the PDU connection request.

When the terminal moves from the 5G network to the EPS network, for the terminal that does not support to indicate the request type as handover in the PDU connection request, it is probably impossible for the network to ensure the preservation of the IP address of the terminal.

Currently, when the 5G network does not directly support to provide, or does not directly provide, a target service (e.g., an IMS voice service or an emergency service) but the EPS network supports the IMS voice service, the target service may be provided for the terminal that resides in the 5G network and has an EPS capability through the procedure of interworking between the 5G network and the EPS network. Hence, the 5G network may transmit a voice service support indicator (e.g., IMS voice over PS session supported over 3GPP access) or an emergency service support indicator to the UE.

When the N26 interface is not supported between the 5G network and the EPS network, usually the terminal that resides in the 5G network may be re-directed to the EPS (e.g., the 5G wireless access network may release a connection of the UE with the 5G network, and then the UE may establish a connection with the EPS).

When the network does not support a procedure of interworking with an N26 interface nor a procedure of interworking without an N26 interface, the preservation of the IP address of the terminal cannot be ensured. When the network supports a procedure of interworking without an N26 interface but the terminal does not support indicating handover, the preservation of the IP address of the terminal may probably not be ensured either.

Based on the above description, it is found that, when the voice service and/or emergency service are provided by the 5G network for the terminal through the procedure of interworking between the 5G network and the EPS network, whether the preservation of the IP address is capable of being maintained is related to many factors. In the embodiments of the present disclosure, solutions will be provided from different perspectives, so as to ensure the preservation of the IP address.

In a specific embodiment of the present disclosure, the terminal may support indicating handover when the terminal supports at least one of initiating handover attachment, initiating location update for indicating handover, and indicating the request type as handover in the PDU connection request. Here, the handover may be used to indicate a request for preservation of the IP address of the terminal when the terminal moves from the first network to the second network.

Whether the terminal supports indicating handover may also include one of whether the terminal supports the handover attachment, and whether the support indicator is an existing PDU session. Information about whether the support indicator is the existing PDU session is used to indicate that a PDU connection currently requested to be established is an existing PDU connection, so as preservation of an IP address.

Whether the first network and/or the second network supports preservation of an IP address of the terminal in accordance with the terminal indicating handover may include whether the first network and/or the second network supports the handover attachment.

In another specific embodiment of the present disclosure, the terminal may support indicating handover when the terminal has one of: a capability that the terminal supports the request for preservation of the IP address of the terminal when the terminal moves from the first network to the second network; a capability that the terminal supports to indicate the request type as handover in the PDU connection establishment request in an attachment request process or a location update request process when the terminal moves from the 5G network to the EPS network; a capability that the terminal supports to indicate the request type as handover in a PDU connection establishment request process when the terminal moves from the 5G network to the EPS network; a capability that the terminal supports to indicate the request type of the PDU connection establishment request as handover and indicate that the terminal moves from the 5G network when an indicator indicating that a procedure of interworking without an N26 interface is supported has been received from the 5G network and the attachment has been initiated at the EPS, so as to subsequently transfer the other PDU session established at the 5G network through indicating the request type as handover in the PDU connection establishment process; a capability that the terminal supports to indicate the request type of the PDU connection establishment request as handover and indicate that the terminal moves from the 5G network in a location area update request when an indicator indicating that a procedure of interworking without an N26 interface is supported has been received from the 5G network and a location update request has been initiated at the EPS (e.g., when the terminal was previously registered at the EPS and a location area (e.g., TA) needs to be updated), so as to transfer the PDU session established at the 5G network; and a capability that the terminal supports to indicate the request type as handover and indicate that the UE moves from the 5G network in the PDU connection establishment process when an indicator indicating that a procedure of interworking without an N26 interface is supported has been received from the 5G network and the PDU connection establishment request has been initiated at the EPS (e.g., the terminal was previously registered at the EPS), so as to transfer the PDU session established at the 5G network.

In the related art, when the 5G network does not directly support to provide, or does not directly provide, the IMS voice service but the IMS voice service is capable of being indirectly provided through the EPS network, the 5G network may transmit an indicator indicating that the voice service is to be supported to the terminal. However, the 5G network fails to pay attention to whether the preservation of the IP address is capable of being ensured (i.e., whether a same IP address is adopted) in a process of re-directing the terminal to an IMS network to support the voice service/emergency service, nor pay attention to whether the voice service/emergency service is capable of being established.

However, the capability of the network and/or terminal preservation of an IP address may be taken by the 5G network into consideration to set a support indicator of the target service. For example, when the IP address of the terminal is determined not to be kept unchanged, the service support indicator of the target service may not be transmitted to the terminal. Parts of the terminals, e.g., a voice-centric terminal, may not be attached to the 5G network, but be attached to the EPS network that supports the target service. At this time, it is able to ensure the terminal to initiate or receive the target service (e.g., the voice service and/or emergency service). However, a data-centric terminal remains unaffected, and may be continuously attached to the 5G network.

Hence, in the embodiments of the present disclosure, a network side may determine whether to transmit the support indicator of the voice service to the terminal and/or how to indicate in accordance with collected information, so as to ensure the terminal to initiate or receive the target service normally.

Figure 2:
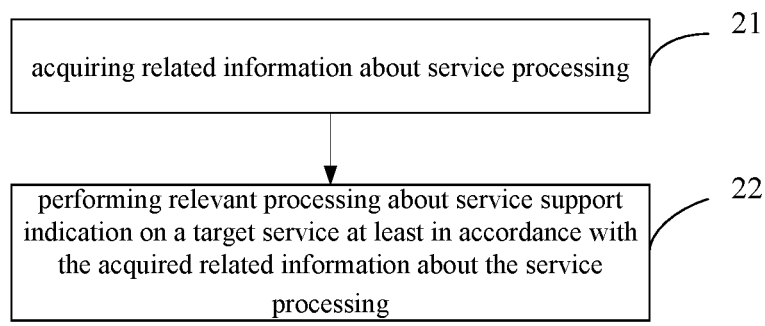
FIG. 2 is a flow chart of a service processing method according to one embodiment of the present disclosure.

As shown in FIG. 2, the present disclosure provides in some embodiments a service processing method for a first network unit in a first network, which includes: Step 21 of acquiring related information about service processing; and Step 22 of performing relevant processing on a target service at least in accordance with the acquired related information about the service processing, the relevant processing on the target service being relevant processing about service support indication.

The related information about the service processing may include at least one of related information indicating whether a terminal supports a request for preservation of an IP address of the terminal, related information indicating whether the first network and/or a second network supports preservation of an IP address of the terminal, related information indicating whether the first network and/or the second network supports a procedure of interworking with an N26 interface, related information indicating whether the first network and/or the second network supports a procedure of interworking without an N26 interface, related information indicating whether the terminal supports indicating handover, related information indicating whether the first network and/or the second network supports preservation of an IP address of the terminal in accordance with the terminal indicating handover, related information about a terminal type, related information about a registration mode of the terminal, related information indicating whether the terminal supports to be re-directed to the second network, related information indicating whether the first network and/or the second network support the target service, related information indicating whether the first network supports to re-direct the terminal to the second network, related information indicating whether the first network supports the target service through re-directing the terminal to the second network.

In a specific embodiment of the present disclosure, the performing the relevant processing on the target service at least in accordance with the acquired relevant information about the service processing may include: when the second network supports the target service, the first network supports to re-direct the terminal to the second network and the terminal supports to be re-directed to the second network, performing the relevant processing on the target service in accordance with the acquired relevant information about the service processing; or when the second network supports the target service and the first network supports the target service through re-directing the terminal to the second network, performing the relevant processing on the target service in accordance with the acquired relevant information about the service processing.

In a specific embodiment of the present disclosure, the performing the relevant processing on the target service may include performing a first operation or performing a second operation. The first operation may include determining service support indication information indicating the target service or determining whether the service support indication information about the target service indicates that the target service is to be supported. The second operation may include determining service support information not indicating the target service or determining whether the service support indication information about the target service indicates that the target service is not to be supported.

In a specific embodiment of the present disclosure, the first operation may be performed when at least one of the following conditions has been met: the terminal supports the request for preservation of the IP address; the first network and/or second network support preservation of an IP address of the terminal; the first network and/or the second network support preservation of an IP address of the terminal and the terminal supports a request for preservation of the IP address; the terminal supports indicating handover; the second network supports indicating handover; the terminal supports a single-registration mode and indicating handover; the terminal supports a double-registration mode; the terminal is a data-centric terminal; the first network and/or the second network support a procedure of interworking with an N26 interface; and the first network and/or the second network support a procedure of interworking without an N26 interface.

In a possible embodiment of the present disclosure, the first operation may be performed when the first network and/or the second network support a procedure of interworking without an N26 interface and at least one of the following conditions has been met: the terminal supports the request for preservation of the IP address, the terminal supports indicating handover, the terminal supports the single-registration mode and indicating handover, the terminal supports the double-registration mode, and the terminal is the data-centric terminal.

In a possible embodiment of the present disclosure, the second operation may be performed when at least one of the following condition has been met: the terminal does not support the request for preservation of the IP address; the first network and/or the second network do not support preservation of the IP address of the terminal; the first network and/or the second network support preservation of an IP address of the terminal but the terminal does not support the request for preservation of the IP address; the terminal is a voice-centric terminal; the first network and/or the second network do not support the procedure of interworking; the first network and/or the second network do not support a procedure of interworking with an N26 interface and do not support a procedure of interworking without an N26 interface; the first network and/or the second network do not support a procedure of interworking without an N26 interface; the first network and/or the second network support a procedure of interworking without an N26 interface but the terminal does not support indicating handover; the first network and/or the second network support a procedure of interworking without an N26 interface, the terminal is the voice-centric terminal but the terminal does not support indicating handover; and the first network and/or the second network support a procedure of interworking without an N26 interface, the terminal supports the single-registration mode but the terminal does not support indicating handover.

In a possible embodiment of the present disclosure, the related information indicating whether the terminal supports indicating handover may include related information indicating that the terminal supports indicating handover. The terminal may support indicating handover when at least one of the following conditions has been met: the terminal supports to initiate handover attachment, the terminal supports to initiate location update for indicating handover, and the terminal supports to indicate the request type in a PDU connection request as handover, or the terminal may support indicating handover when the terminal has one of a capability that the terminal supports the request for preservation of the IP address of the terminal when the terminal moves from the first network to the second network, and a capability that the terminal supports to indicate the request type in a PDU connection establishment request as handover in an attachment request process or location update request process when the terminal moves from a 5G network to an EPS network.

In a possible embodiment of the present disclosure, the handover may include indicating the request for preservation of the IP address of the terminal when the terminal moves from the first network to the second network.

In a possible embodiment of the present disclosure, whether the first network and/or the second network support preservation of an IP address of the terminal in accordance with the terminal indicating handover may include whether the first network and/or the second network support the handover attachment.

In a possible embodiment of the present disclosure, the target service may include an IMS voice service, and the service support indicator may include one of an IMS voice over PS session supported indicator and an IMS voice over PS session supported indicator over 3GPP.

In the related art, when the 5G network does not directly support to provide, or does not directly provide, the IMS voice service but the IMS voice service is capable of being indirectly provided through the EPS network, the 5G network may transmit an indicator indicating that the voice service is to be supported to the terminal. However, the 5G network fails to pay attention to whether the preservation of the IP address is capable of being ensured (i.e., whether a same IP address is adopted) in a process of re-directing the terminal to an IMS network to support the voice service/emergency service, nor pay attention to whether the voice service/emergency service is capable of being established.

However, the capability of the network and/or terminal preservation of an IP address may be taken by the 5G network into consideration to set a support indicator of the target service. For example, when the IP address of the terminal is determined not to be kept unchanged, the service support indicator of the target service may not be transmitted to the terminal. Parts of the terminals, e.g., a voice-centric terminal, may not be attached to the 5G network, but be attached to the EPS network that supports the target service. At this time, it is able to ensure the terminal to initiate or receive the target service (e.g., the voice service and/or emergency service). However, a data-centric terminal remains unaffected, and may be continuously attached to the 5G network.

Hence, according to the embodiments of the present disclosure, the terminal may perform relevant processing about access zone selection in accordance with the acquired relevant information about the service processing, so as to enable the terminal to initiate or receive a target service normally.

Figure 3:
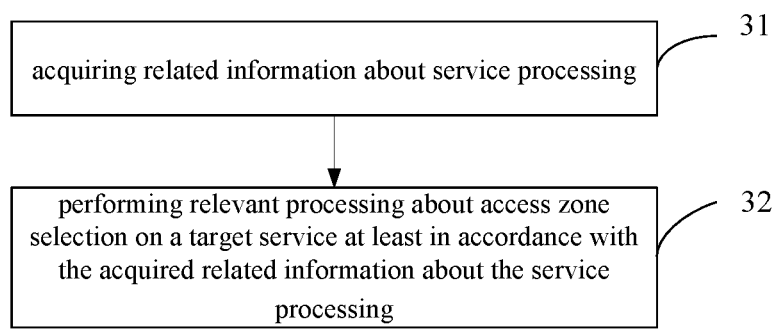
FIG. 3 is a flow chart of another service processing method according to one embodiment of the present disclosure.

As shown in FIG. 3, the present disclosure further provides in some embodiments a service processing method for a terminal, which includes: Step 31 of acquiring related information about service processing; and Step 32 of performing relevant processing on a target service at least in accordance with the acquired related information about the service processing, the relevant processing on the target service being relevant processing about access zone selection.

The related information about the service processing may include at least one of related information indicating whether the terminal supports a request for preservation of an IP address of the terminal, related information indicating whether the first network and/or a second network supports preservation of an IP address of the terminal, related information indicating whether the first network and/or the second network supports a procedure of interworking with an N26 interface, related information indicating whether the first network and/or the second network supports a procedure of interworking without an N26 interface, related information indicating whether the terminal supports indicating handover, related information indicating whether the first network and/or the second network supports preservation of an IP address of the terminal in accordance with the terminal indicating handover, related information about a terminal type, related information about a registration mode of the terminal, related information indicating whether the terminal supports to be re-directed to the second network, related information indicating whether the first network and/or the second network support the target service, related information indicating whether the first network supports to re-direct the terminal to the second network, related information indicating whether the first network supports the target service through re-directing the terminal to the second network.

The terminal may acquire one or more pieces of related information about the service processing in accordance with its own configuration, or receive the one or more pieces of related information about the service processing through one of a first network unit and a second network unit.

The second network unit may be a second network unit of the first network or a core network unit of the second network, and it may include at least one of AMF and MME.

The second network unit may be a second network unit of the first network or a wireless access network unit of the second network, and it may include at least one of NR, eLTE, NG-RAN, UTRAN and eNB.

It should be appreciated that, relevant contents about whether the terminal supports indicating handover have been described hereinabove, and thus will not be particularly defined herein.

In a specific embodiment of the present disclosure, whether the first network supports to re-direct the terminal to the second network may include whether a wireless access network of the first network supports to re-direct the terminal to the second network when a QoS flow for the target service is established. The terminal type may include, but not limited to, one of a voice-centric terminal and a data-centric terminal. The registration mode of the terminal may include, but not limited to, one of a single-registration mode and a double-registration mode.

In a specific embodiment of the present disclosure, it is necessary to perform the relevant processing about the access zone selection, so as to ensure the preservation of the IP address for the target service. In a possible embodiment of the present disclosure, when the second network does not support the target service, or the first network or the terminal does not support the re-direction to the second network, or the first network does not support the target service through re-directing the terminal to the second network, a change in the IP address may not occur due to the re-direction. Hence, the above method may be performed merely in some cases.

In a specific embodiment of the present disclosure, the performing the relevant processing about the access zone selection at least in accordance with the acquired related information about the service processing may include: when the second network supports the target service, the first network supports to re-direct the terminal to the second network and the terminal supports to be re-directed to the second network, performing the relevant processing about the access zone selection at least in accordance with the acquired related information about the service processing; or when the second network supports the target service and the first network supports the target service through re-directing the terminal to the second network, performing the relevant processing about the access zone selection at least in accordance with the acquired related information about the service processing.

In a specific embodiment of the present disclosure, the terminal may perform the relevant processing about the access zone selection in accordance with collected information. The relevant processing about the access zone selection may include at least one of: selecting to reside in the first network; stopping the selection to reside in the first network; and selecting to reside in the second network.

In a possible embodiment of the present disclosure, the terminal may stop the selection to reside in the first network through disabling a capability of the terminal to access the second network.

In a specific embodiment of the present disclosure, the terminal may collect a large amount of information to perform the relevant processing about the access zone selection. One result may be that the terminal continues to be maintained in the first network for the target service, and another result may be that the terminal selects the second network for the target service. Some possible strategies about how to select an access zone in various circumstances will be described hereinafter.

In a specific embodiment of the present disclosure, the terminal may select to reside in the first network when at least one of the following conditions has been met: the terminal supports the request for preservation of the IP address; the first network and/or the second network support preservation of an IP address of the terminal; and the first network and/or the second network support preservation of an IP address of the terminal and the terminal supports the request for preservation of the IP address.

When the terminal supports the request for preservation of the IP address, it may include that the terminal supports indicating handover, that the second network supports indicating handover, that the terminal supports the single-registration mode and indicating handover, and that the terminal supports the double-registration mode.

In a specific embodiment of the present disclosure, the terminal may further select to reside in the first network when at least one of the following conditions has been met: the terminal is a data-centric terminal; the first network and/or the second network support a procedure of interworking with an N26 interface; and the first network and/or the second network support a procedure of interworking without an N26 interface.

In the above modes, the terminal may reside in the first network. When the first network supports the target service through re-directing the terminal to the second network, it is also able preservation of an IP address.

For the data-centric terminal, its voice service has a relatively low priority level, so it may still select to reside in the first network (e.g., the 5G network) when the first network provides the target service through re-directing the terminal to the second network and the terminal does not support indicating handover, i.e., when the preservation of the IP address is incapable of being ensured.

In the above cases, when the first network and/or the second network support a procedure of interworking without an N26 interface, in one implementation mode, support needs to be provided by the terminal so as to ensure the preservation of the IP address. Hence, in a case where the first network and/or the second network support a procedure of interworking without an N26 interface, the terminal may select to reside in the first network when any of the following additional conditions has been met: the terminal supports the request for preservation of the IP address; the terminal supports indicating handover; the terminal supports the single-registration mode and indicating handover; the terminal supports the double-registration mode; and the terminal is a data-centric terminal.

The conditions for the terminal to select to reside in the first network have been described hereinabove, and conditions for the terminal to stop the selection to reside in the first network or to select to reside in the second network will be described hereinafter.

In a specific embodiment of the present disclosure, the terminal may stop the selection to reside in the first network or select to reside in the second network when at least one of the following conditions has been met: the terminal does not support the request for preservation of the IP address; the first network and/or the second network do not support preservation of an IP address of the terminal; the first network and/or the second network support preservation of an IP address of the terminal but the terminal does not support the request for preservation of the IP address; the terminal is a voice-centric terminal; the first network and/or the second network do not support the procedure of interworking; the first network and/or the second network do not support a procedure of interworking with an N26 interface and do not support a procedure of interworking without an N26 interface; the first network and/or the second network do not support a procedure of interworking without an N26 interface; the first network and/or the second network support a procedure of interworking without an N26 interface but the terminal does not support indicating handover; the first network and/or the second network support a procedure of interworking without an N26 interface, the terminal is a voice-centric terminal but the terminal does not support indicating handover; the first network and/or the second network support a procedure of interworking without an N26 interface, the terminal supports the single-registration mode but the terminal does not support indicating handover; and the first network and/or the second network support a procedure of interworking without an N26 interface, the terminal is the voice-centric terminal, the terminal supports the single-registration mode but the terminal does not support indicating handover.

In a specific embodiment of the present disclosure, the first network and the second network may be different networks, e.g., 5G network and EPS network.

In the related art, when the 5G network does not directly support to provide, or does not directly provide, the IMS voice service but the IMS voice service is capable of being indirectly provided through the EPS network, the 5G network may transmit an indicator indicating that the voice service is to be supported to the terminal. However, the 5G network fails to pay attention to whether the preservation of the IP address is capable of being ensured (i.e., whether a same IP address is adopted) in a process of re-directing the terminal to an IMS network to support the voice service/emergency service, nor pay attention to whether the voice service/emergency service is capable of being established.

However, the capability of the network and/or terminal about preservation of an IP address may be taken by the 5G network into consideration to set a support indicator of the target service. For example, when the IP address of the terminal is determined not to be kept unchanged, the service support indicator of the target service may not be transmitted to the terminal. Parts of the terminals, e.g., a voice-centric terminal, may not be attached to the 5G network, but be attached to the EPS network that supports the target service. At this time, it is able to ensure the terminal to initiate or receive the target service (e.g., the voice service and/or emergency service). However, a data-centric terminal remains unaffected, and may be continuously attached to the 5G network.

Hence, in the embodiments of the present disclosure, a wireless access unit at a network side may determine whether to re-direct the terminal in accordance with collected information, so as to enable the terminal to initiate or receive the target service normally.

Figure 4:
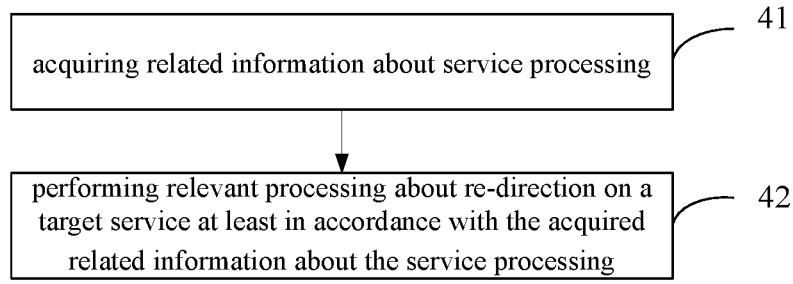
FIG. 4 is a flow chart of yet another service processing method according to one embodiment of the present disclosure.

As shown in FIG. 4, the present disclosure provides in some embodiments a service processing method for a first network unit in a first network, which includes: Step 41 of acquiring related information about service processing; and Step 42 of performing relevant processing on a target service at least in accordance with the acquired related information about the service processing, the relevant processing on the target service being relevant processing about re-direction.

The related information about the service processing may include at least one of related information indicating whether a terminal supports a request for preservation of an IP address of the terminal, related information indicating whether the first network and/or a second network supports preservation of an IP address of the terminal, related information indicating whether the first network and/or the second network supports a procedure of interworking with an N26 interface, related information indicating whether the first network and/or the second network supports a procedure of interworking without an N26 interface, related information indicating whether the terminal supports indicating handover, related information indicating whether the first network and/or the second network supports preservation of an IP address of the terminal in accordance with the terminal indicating handover, related information about a terminal type, related information about a registration mode of the terminal, related information indicating whether the terminal supports to be re-directed to the second network, related information indicating whether the first network and/or the second network support the target service, related information indicating whether the first network supports to re-direct the terminal to the second network, related information indicating whether the first network supports the target service through re-directing the terminal to the second network.

The first network unit may acquire one or more pieces of related information about the service processing in accordance with its own configuration, or receive the one or more pieces of related information about the service processing through one of a second network unit and the terminal.

The second network unit may be a second network unit of the first network or a core network unit of the second network, and it may include at least one of core network unit and wireless access network unit.

It should be appreciated that, relevant contents about whether the terminal supports indicating handover have been described hereinabove, and thus will not be particularly defined herein.

In a specific embodiment of the present disclosure, whether the first network supports to re-direct the terminal to the second network may include whether a wireless access network of the first network supports to re-direct the terminal to the second network when a QoS flow for the target service is established. The terminal type may include, but not limited to, one of a voice-centric terminal and a data-centric terminal. The registration mode of the terminal may include, but not limited to, one of a single-registration mode and a double-registration mode.

In a specific embodiment of the present disclosure, it is necessary to perform the relevant processing about the re-direction, so as to ensure the preservation of the IP address for the target service. In a possible embodiment of the present disclosure, when the second network does not support the target service, or the first network or the terminal does not support the re-direction to the second network, or the first network does not support the target service through re-directing the terminal to the second network, a change in the IP address may not occur due to the re-direction. Hence, the above method may be performed merely in some cases.

The performing the relevant processing about the re-direction at least in accordance with the acquired related information about the service processing may include: when the second network supports the target service, the first network supports to re-direct the terminal to the second network and the terminal supports to be re-directed to the second network, performing the relevant processing about the re-direction at least in accordance with the acquired related information about the service processing; or when the second network supports the target service and the first network supports the target service through re-directing the terminal to the second network, performing the relevant processing about the re-direction at least in accordance with the acquired related information about the service processing.

In a specific embodiment of the present disclosure, a network side may perform the relevant processing about the re-direction for the target service in accordance with collected information, and the relevant processing about the re-direction for the target service may include at least one of: re-directing the terminal to the second network for the target service; and maintaining the terminal in the first network for the target service.

In a specific embodiment of the present disclosure, the first network unit in the first network may collect a large amount of information to perform the relevant processing about the re-direction for the target service. One result may be that the terminal is re-directed to the second network for the target service, and another result may be that the terminal is maintained in the first network for the target service. In one implementation mode, the first network may support the target service, but cannot directly provide the target service because it is impossible to ensure the reliability. However, when the terminal is re-directed to the second network, a change in the IP address may occur and thereby the service may be interrupted. At this time, it would be better to maintain the terminal in the first network, so as to provide the target service with low reliability. Some possible strategies about whether to re-direct the terminal to the second network for the target service or maintain the terminal in the first network for the target service in various circumstances will be described hereinafter.

In a specific embodiment of the present disclosure, the terminal may be re-directed to the second network for the target service when at least one of the following conditions has been met: the terminal supports the request for preservation of the IP address; the first network and/or the second network support preservation of an IP address of the terminal; and the first network and/or the second network support preservation of an IP address of the terminal and the terminal supports the request for preservation of the IP address.

When the terminal supports the request for preservation of the IP address, it may include that the terminal supports indicating handover, that the second network supports indicating handover, that the terminal supports the single-registration mode and indicating handover, and that the terminal supports the double-registration mode.

In a specific embodiment of the present disclosure, the terminal may be re-directed to the second network for the target service when at least one of the following conditions has been met: the terminal is the data-centric terminal; the first network and/or the second network support a procedure of interworking with an N26 interface; and the first network and/or the second network support a procedure of interworking without an N26 interface.

In the above modes, it is able to re-direct the terminal to the second network for the target service, and remain the preservation of the IP address.

In the above cases, when the first network and/or the second network support a procedure of interworking without an N26 interface, in one implementation mode, support needs to be provided by the terminal so as to ensure the preservation of the IP address. Hence, in a case where the first network and/or the second network support a procedure of interworking without an N26 interface, the terminal may be re-directed to the second network for the target service when any of the following additional conditions has been met: the terminal supports the request for preservation of the IP address; the terminal supports indicating handover; the terminal supports the single-registration mode and indicating handover; the terminal supports the double-registration mode; and the terminal is the data-centric terminal.

The conditions for the first network to re-direct the terminal to the second network have been described hereinabove, and conditions for the terminal to be maintained in the first network for the target service will be described hereinafter.

In a specific embodiment of the present disclosure, the terminal may be maintained in the first network for the target service when at least one of the following conditions has been met: the terminal does not support the request for preservation of the IP address; the first network and/or the second network do not support preservation of an IP address of the terminal; the first network and/or the second network support preservation of an IP address of the terminal but the terminal does not support the request for preservation of the IP address; the terminal is the voice-centric terminal; the first network and/or the second network do not support the procedure of interworking; the first network and/or the second network do not support a procedure of interworking with an N26 interface and do not support a procedure of interworking without an N26 interface; the first network and/or the second network do not support a procedure of interworking without an N26 interface; the first network and/or the second network support a procedure of interworking without an N26 interface but the terminal does not support indicating handover; the first network and/or the second network support a procedure of interworking without an N26 interface, the terminal is the voice-centric terminal but the terminal does not support indicating handover; the first network and/or the second network support a procedure of interworking without an N26 interface, the terminal supports the single-registration mode but the terminal does not support indicating handover; and the first network and/or the second network support a procedure of interworking without an N26 interface, the terminal is the voice-centric terminal, the terminal supports the single-registration mode but the terminal does not support indicating handover.

In a specific embodiment of the present disclosure, the first network and the second network may be different networks, e.g., 5G network and EPS network.

The first network unit in the first network may be wireless access network unit, NG-RAN, eLTE or NR.

Figure 5:
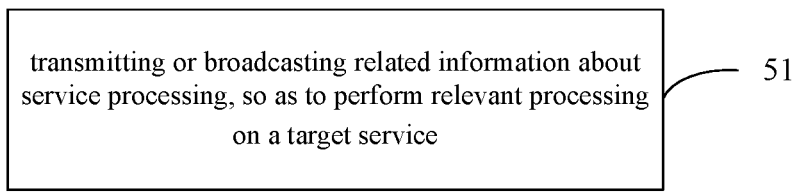
FIG. 5 is a flow chart of an information transmission method according to one embodiment of the present disclosure.

As shown in FIG. 5, the present disclosure further provides in some embodiments an information transmission method, which includes Step 51 of transmitting or broadcasting related information about service processing, so as to perform relevant processing on a target service. The related information about the service processing may include at least one of related information indicating whether a terminal supports a request for preservation of an IP address of the terminal, related information indicating whether the first network and/or a second network supports preservation of an IP address of the terminal, related information indicating whether the first network and/or the second network supports a procedure of interworking with an N26 interface, related information indicating whether the first network and/or the second network supports a procedure of interworking without an N26 interface, related information indicating whether the terminal supports indicating handover, related information indicating whether the first network and/or the second network supports preservation of an IP address of the terminal in accordance with the terminal indicating handover, related information about a terminal type, related information about a registration mode of the terminal, related information indicating whether the terminal supports to be re-directed to the second network, related information indicating whether the first network and/or the second network support the target service, related information indicating whether the first network supports to re-direct the terminal to the second network, related information indicating whether the first network supports the target service through re-directing the terminal to the second network.

The relevant processing on the target service may include one of relevant processing about service support indication for the target service, relevant processing about access zone selection, and relevant processing about re-direction for the target service.

In a specific embodiment of the present disclosure, the transmitting or broadcasting the related information about the service processing to perform the relevant processing about the service support indication for the target service may be executed by one of a second network unit or the terminal. The second network unit may be a second network unit of the first network or a network unit of the second network, and it may include at least one of a core network unit and a wireless access network unit.

In a specific embodiment of the present disclosure, the transmitting or broadcasting the related information about the service processing to perform the relevant processing about the access zone selection may be executed by one of a first network unit and the second network unit.

In a specific embodiment of the present disclosure, the transmitting or broadcasting the related information about the service processing to perform the relevant processing about the re-direction for the target service may be executed by one of the second network unit and the terminal.

It should be appreciated that, relevant contents about whether the terminal supports indicating handover have been described hereinabove, and thus will not be particularly defined herein.

In a specific embodiment of the present disclosure, whether the first network supports to re-direct the terminal to the second network may include whether a wireless access network of the first network supports to re-direct the terminal to the second network when a QoS flow for the target service is established. The terminal type may include, but not limited to, one of a voice-centric terminal and a data-centric terminal. The registration mode of the terminal may include, but not limited to, one of a single-registration mode and a double-registration mode.

In a specific embodiment of the present disclosure, the network unit in the first network may acquire the related information about the service processing, and perform the relevant processing about the service support indication for the target service at least in accordance with the acquired related information about the service processing. Relevant contents on the relevant processing about the service support indication for the target service have been described hereinabove, and thus will not be particularly defined herein.

In a specific embodiment of the present disclosure, the terminal may acquire the related information about the service processing, and perform the relevant processing about the access zone selection at least in accordance with the acquired related information about the service processing. Identically, relevant contents on the relevant processing about the access zone selection have been described hereinabove, and thus will not be particularly defined herein.

In a specific embodiment of the present disclosure, the network unit in the first network may acquire the related information about the service processing, and perform the relevant processing about the re-direction at least in accordance with the acquired related information about the service processing. Identically, relevant contents on the relevant processing about the re-direction have been described hereinabove, and thus will not be particularly defined herein.

The service processing methods will be described hereinafter in conjunction with specific embodiments. It should be appreciated that, parts of the parameters mentioned hereinabove may merely be taken into consideration in the following specific embodiments.

Figure 6:
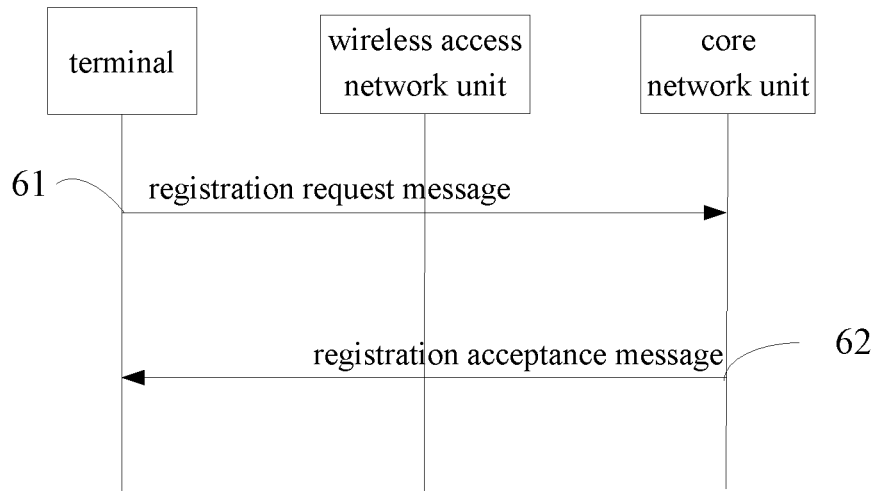
FIG. 6 is a schematic view showing the service processing method according to one embodiment of the present disclosure.

As shown in FIG. 6, the present disclosure provides a service processing method which includes the following steps.

Step 61: transmitting, by a terminal, a registration request message to a core network unit.

In a possible embodiment of the present disclosure, the registration request message may include at least one of: one or more pieces of related information about service processing (the related information about the service processing may refer to Step 22 and thus will not be particularly defined herein), whether a UE supports handover attachment (i.e., related information indicating whether the terminal supports a request for preservation of an IP address of the terminal), and whether the UE is a voice-centric UE or a data-centric UE (i.e., related information indicating a terminal type). It should be appreciated that, the data-centric UE may be considered as a non-voice-centric UE.

In a specific embodiment of the present disclosure, the core network unit may perform relevant processing about service support indication for a target service at least in accordance with the related information about the service processing acquired in Step 61 and/or Step 71 and/or its own configuration as mentioned in Step 22, which will thus not be particularly defined herein.

Step 62: transmitting, by the core network unit, a registration acceptance message to the terminal.

In a specific embodiment of the present disclosure, the core network unit (e.g., AMF) may receive the registration request message from the UE, and determine whether to transmit a service support indicator for the target service to the UE in accordance with collected information. The target service may include a voice service (an above-mentioned voice service) or an emergency service.

In a specific embodiment of the present disclosure, when the core network unit (e.g., MME or AMF) determines whether to transmit the service support indicator for the voice service to the UE, a specific implementation procedure will be interpreted as follows.

The core network unit (e.g., AMF) may determine whether to transmit the service support indicator for the voice service to the UE in accordance with at least one of: whether the UE supports handover attachment, whether an N26 interface is configured, whether a 5G network directly supports the voice service, whether an EPS network supports the voice service, whether the 5G network supports the voice service through re-directing the UE to the other network (e.g., EPS network), whether the UE is a voice-centric UE, and whether the UE is a data-centric UE.

To be specific, upon the receipt of the registration request message from the UE, the core network unit (e.g., AMF) may transmit the registration acceptance message to the UE. In a possible embodiment of the present disclosure, the registration acceptance message may at least include indication information indicating whether the voice service is supported.

In a possible embodiment of the present disclosure, when the 5G network (e.g., 5G radio access network (Radio Access Network, RAN)) supports the voice service through re-directing the UE to the other network and there is no N26 interface, the 5G network may determine whether to transmit the service support indicator for the voice service in accordance with whether the UE supports the handover attachment.

Optionally, when the 5G network (e.g., 5G RAN) supports the voice service through re-directing the UE to the other network (e.g., EPS network), there is no N26 interface and the UE is the voice-centric UE, the 5G network may determine whether to transmit the service support indicator for the voice service to the UE in accordance with whether the UE supports the handover attachment.

Optionally, when the 5G network (e.g., 5G RAN) supports the voice service through re-directing the UE to the other network (e.g., EPS network), the 5G network may determine whether to transmit the service support indicator for the voice service to the UE in accordance with whether the UE supports the handover attachment.

Optionally, when the 5G network determines whether to transmit the service support indicator for the voice service to the UE in accordance with whether the UE supports the handover attachment, one of the following processings may be performed.

In specific embodiments of the present disclosure, when the UE supports the handover attachment, the 5G network may transmit the service support indicator (e.g., IMS voice over PS Session Supported Indication or IMS voice over PS Session Supported Indication over 3GPP) for the voice service to the UE. At this time, an IP address of the UE may be kept unchanged after the re-direction, and the voice service may be continued.

When the UE does not support the handover attachment, the 5G network may not transmit the service support indicator for the voice service to the UE or transmit a service nonsupport indicator for the voice service to the UE (e.g., the IMS voice over PS Session Supported Indication indicates that the voice service is not supported or the MS voice over PS Session Supported Indication over 3GPP indicates that the voice service is not supported). At this time, the voice-centric UE may not be attached to the 5G network in accordance with a zone selection rule, and instead, it may be attached to a network that supports the voice service (e.g., EPS network). In this way, the voice service for the UE may be supported. It should be appreciated that, the data-centric UE may depend on implementation. When the UE wants to initiate a call, the UE may access the EPS based on the UE implementation. However, when UE is being called, a voice call may be lost. Because the UE is the data-centric UE, there should not be much impact.

In a specific embodiment of the present disclosure, when the core network unit (e.g., MME or AMF) determines whether to transmit the service support indicator for the emergency service to the UE, a specific implementation procedure will be interpreted as follows.

The core network unit (e.g., AMF) may determine whether to transmit the service support indicator for the emergency service to the UE in accordance with at least one of: whether the UE supports the handover attachment, whether the N26 interface is configured, whether the 5G network directly supports the voice service, whether the EPS network supports the voice service, whether the 5G network supports the voice service through re-directing the UE to the other network (e.g., EPS network), whether the UE is the voice-centric UE, and whether the UE is the data-centric UE.

The core network unit (e.g., AMF) may transmit a registration acceptance message to the UE. In a possible embodiment of the present disclosure, the registration acceptance message may at least include indication information indicating whether the emergency service is supported.

In a possible embodiment of the present disclosure, when the 5G network (e.g., new radio (New Radio, NR) or eLTE) supports the voice service through re-directing the UE to the other network (e.g., EPS network) and there is no N26 interface, the 5G network may determine whether to transmit the service support indicator for the emergency service to the UE in accordance with whether the UE supports the handover attachment (per TA per RAT).

In a possible embodiment of the present disclosure, when the 5G network (e.g., NR or eLTE) supports the voice service through re-directing the UE to the other network (e.g., EPS network), there is no N26 interface and the UE is the voice-centric UE), the 5G network may transmit the service support indicator for the emergency service to the UE in accordance with whether the UE supports the handover attachment.

In a possible embodiment of the present disclosure, when the 5G network (e.g., NR or eLTE) supports the voice service through re-directing the UE to the other network (e.g., EPS network), the 5G network may transmit the service support indicator for the emergency service to the UE in accordance with whether the UE supports the handover attachment.

In a specific embodiment of the present disclosure, when the core network unit determines whether to transmit the service support indicator for the emergency service to the UE in accordance with whether the UE supports the handover attachment, one of the following processings may be performed.

When the UE supports the handover attachment, the 5G network may transmit the service support indicator for the emergency service to the UE. At this time, the IP address of the UE may be preserved after the re-direction, and the emergency service may be continued.

When the UE does not support the handover attachment, the 5G network may not transmit the service support indicator for the emergency service to the UE or transmit a service nonsupport indicator for the emergency service to the UE. At this time, the voice-centric UE may not be attached to the 5G network in accordance with the zone selection rule, and instead, it may be attached to a network that supports the emergency service (e.g., EPS network). In this way, the voice service for the UE may be supported. It should be appreciated that, the data-centric UE may depend on implementation. When the UE wants to initiate a call, the UE may access the EPS based on the UE implementation.

However, when UE is being called, a voice call may be lost. Because the UE is the data-centric UE, there should not be much impact.

When the UE does not support the handover attachment, the 5G network may not transmit the service support indicator for the emergency service, but transmit an emergency service indicator in a fallback manner. At this time, for a calling emergency service, when the UE supports an emergency service request in a fallback manner, the UE may initiate a service request, the UE may initiate a PDN connection establishment for the emergency service again after the UE falls back to the EPS network, and the emergency service may be continued. When the UE is being called, a service may be interrupted, but the emergency service is not called, so there should not be much impact.

When the UE does not support the handover attachment and the UE is the data-centric UE, the 5G network may transmit the service support indicator for the emergency service to the UE. After the UE is re-directed to the EPS network, the UE may initiate a voice calling again. However, when UE is being called, a voice call may be lost. Because the UE is the data-centric UE, there should not be much impact.

In a specific embodiment of the present disclosure, when the UE selects the access zone in accordance with a response from the core network unit (e.g., MME or AMF), a specific implementation procedure will be interpreted as follows.

In the embodiments of the present disclosure, upon the receipt of the registration request message from the UE, the core network unit (e.g., AMF) may transmit the registration acceptance message to the UE. In a possible embodiment of the present disclosure, the registration acceptance message may include at least one of whether the N26 interface is supported, whether the 5G network directly supports the voice service, whether the EPS supports the voice service, and whether the 5G network supports the voice service through re-directing the UE to the other network (e.g., EPS network).

In a possible embodiment of the present disclosure, the UE may select a UE access zone at least in accordance with whether the UE supports the handover attachment. To be specific, when the UE selects the UE access zone in accordance with whether the UE supports the handover attachment, one of the following processings may be performed.

When the UE supports the handover attachment, the UE having a 5G network capability may select the 5G network to access (e.g., select a cell connected to a 5G core network).

When the UE does not support the handover attachment, the UE having the 5G network capability may select not to access the 5G network, or the UE having the 5G network capability and an EPS network capability may select the EPS network to access.

In a possible embodiment of the present disclosure, when the 5G network (e.g., NR or eLTE) supports the voice service or the emergency service through re-directing the UE to the other network (e.g., EPS network) and there is no N26 interface, the UE needs to select the UE access zone in accordance with whether the UE supports the handover attachment.

In a possible embodiment of the present disclosure, when the 5G network (e.g., NR or eLTE) supports the voice service or the emergency service through re-directing the UE to the other network (e.g., EPS network), there is no N26 interface and the UE is the voice-centric UE, the UE may select the UE access zone in accordance with whether the UE supports the handover attachment.

In a possible embodiment of the present disclosure, when the 5G network (e.g., NR or eLTE) supports the voice service or the emergency service through re-directing the UE to the other network (e.g., EPS network), the UE may select the UE access zone in accordance with whether the UE supports the handover attachment.

Figure 7:
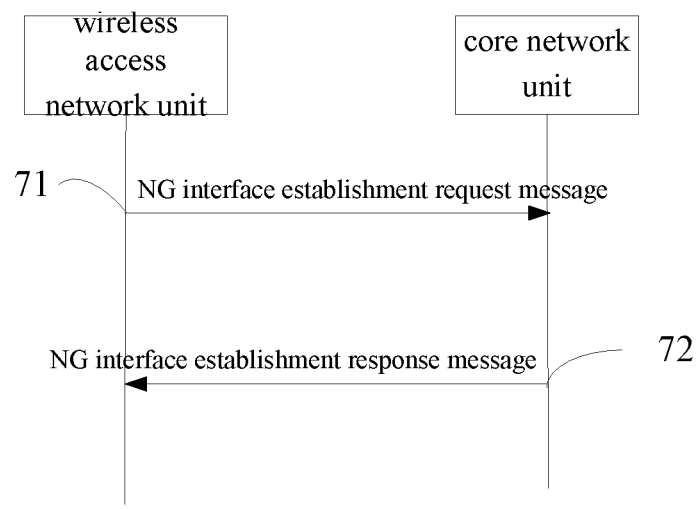
FIG. 7 is another schematic view showing the service processing method according to one embodiment of the present disclosure.

In a possible embodiment of the present disclosure, the wireless access network unit may transmit the related information about the service processing to the core network unit through an NG interface establishment request message (e.g., the related information indicating whether the wireless access network unit supports the voice service or the emergency service through re-directing the UE to the other network (e.g., EPS network)), and the core network unit may transmit the related information about the service processing to the wireless access network unit through an NG interface establishment response message (e.g., the related information indicating whether the core network unit supports the N26 interface). To be specific, as shown in FIG. 7, the service processing method may include the following steps.

Step 71: transmitting, by the wireless access network unit, the NG interface establishment request message to the core network unit.

In a possible embodiment of the present disclosure, the NG interface establishment request message may at least include one or more pieces of the related information about the service processing (the related information about the service processing may refer to Step 22 and thus will not be particularly defined herein), and whether the wireless access network unit supports the voice service or the emergency service through re-directing the UE to the other network (e.g., EPS network).

Step 72: transmitting, by the core network unit, the NG interface establishment response message to the wireless access unit. In a possible embodiment of the present disclosure, the NG interface establishment response message may at least include one or more pieces of the related information about the service processing (the related information about the service processing may refer to Step 22 and thus will not be particularly defined herein), and whether the core network unit supports the N26 interface.

Figure 8:
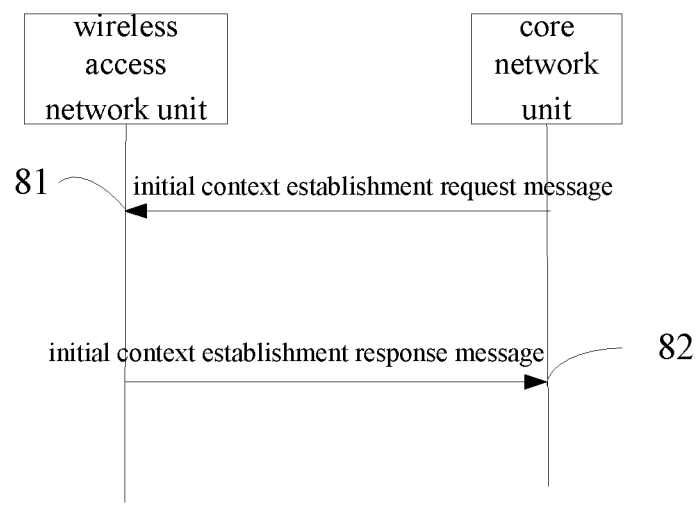
FIG. 8 is yet another schematic view showing the service processing method according to one embodiment of the present disclosure.

In a possible embodiment of the present disclosure, the core network unit may transmit the related information about the service processing to the wireless access network unit through an initial context establishment request message (e.g., whether the core network unit supports the N26 interface, whether the UE supports the handover attachment, whether the UE is the voice-centric UE and whether the UE is the data-centric UE; it should be appreciated that, the data-centric UE may be considered as a non-voice-centric UE). The wireless access network unit may transmit the related information about the service processing to the core network unit through an initial context establishment response message (e.g., the related information indicating whether the wireless access unit supports the voice service or the emergency service through re-directing the UE to the other network (e.g., EPS network). To be specific, as shown in FIG. 8, the service processing method may include the following steps.

Step 81: transmitting, by the core network unit, the initial context establishment request message to the wireless access network unit.

In a possible embodiment of the present disclosure, the initial context establishment request message may include at least one of the related information about the service processing (the related information about the service processing may refer to Step 22 and thus will not be particularly defined herein), whether the core network unit supports the N26 interface, whether the UE supports the handover attachment, whether the UE is the voice-centric UE, and whether the UE is the data-centric UE. It should be appreciated that, the data-centric UE may be considered as a non-voice-centric UE.

In a specific embodiment of the present disclosure, the wireless access network unit (e.g., NR or eLTE) may perform relevant processing about the re-direction for the target service at least in accordance with the related information about the service processing acquired in Step 81 and/or Step 72 and/or its own configuration as mentioned in Step 42, which will thus not be particularly defined herein.

Step 82: transmitting, by the wireless access network unit, the initial context establishment response message to the core network unit.

In a possible embodiment of the present disclosure, the initial context establishment response message may include whether the wireless access network unit supports the voice service or the emergency service through re-directing the UE to the other network (e.g., EPS network).

In a possible embodiment of the present disclosure, the wireless access network unit may determine whether to re-direct the UE to the other network (e.g., EPS network) that supports the voice service or the emergency service at least in accordance with whether the UE supports the handover attachment. When the UE selects the UE access zone in accordance with whether the UE supports the handover attachment, one of the following processings may be performed.

When the UE supports the handover attachment, the UE may be re-directed to the other network (e.g., EPS network) that supports the voice service or the emergency service.

When the UE does not support the handover attachment, the UE may not be re-directed to the other network (e.g., EPS network) that supports the voice service or the emergency service. At this time, although not so reliable, the voice service or the emergency service may still probably be provided to the UE through the 5G network. Otherwise, after the UE has been re-directed to the EPS network, the IP address may change, and thereby the call drop may occur.

In the embodiments of the present disclosure, upon the receipt of a QoS flow establishment request or a service request for the voice service or the emergency service, one of the following processings may be performed.

When the wireless access network unit is configured to support the voice service or the emergency service through re-directing the UE to the other network (e.g., the EPS network) and the core network unit indicates that the N26 interface is not supported, the wireless access network unit may determine whether to re-direct the UE to the other network (e.g., EPS network) in accordance with whether the UE supports the handover attachment.

When the wireless access network unit is configured to support the voice service or the emergency service through re-directing the UE to the other network (e.g., the EPS network), the core network unit indicates that the N26 interface is not supported and the UE is the voice-centric UE, the wireless access network unit may determine whether to re-direct the UE to the other network (e.g., EPS network) in accordance with whether the UE supports the handover attachment.

When the wireless access network unit is configured to support the voice service or the emergency service through re-directing the UE to the other network (e.g., the EPS network), the wireless access network unit may determine whether to re-direct the UE to the other network (e.g., EPS network) in accordance with whether the UE supports the handover attachment.

Figure 9:
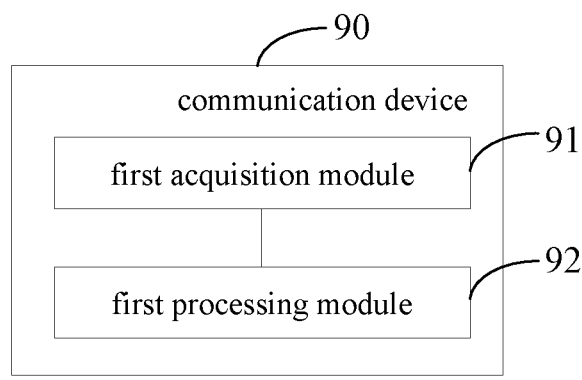
FIG. 9 is a schematic view showing a communication device according to one embodiment of the present disclosure.

As shown in FIG. 9, the present disclosure further provides in some embodiments a communication device 90 which includes: a first acquisition module 91 configured to acquire related information about service processing, the related information about the service processing including at least one of related information indicating whether a terminal supports a request for preservation of an IP address of the terminal, related information indicating whether the first network and/or a second network supports preservation of an IP address of the terminal, related information indicating whether the first network and/or the second network supports a procedure of interworking with an N26 interface, related information indicating whether the first network and/or the second network supports a procedure of interworking without an N26 interface, related information indicating whether the terminal supports indicating handover, related information indicating whether the first network and/or the second network supports preservation of an IP address of the terminal in accordance with the terminal indicating handover, related information about a terminal type, related information about a registration mode of the terminal, related information indicating whether the terminal supports to be re-directed to the second network, related information indicating whether the first network and/or the second network support a target service, related information indicating whether the first network supports to re-direct the terminal to the second network, related information indicating whether the first network supports the target service through re-directing the terminal to the second network; and a first processing module 92 configured to perform relevant processing on the target service at least in accordance with the acquired related information about the service processing, the relevant processing on the target service being relevant processing about service support indication.

In a possible embodiment of the present disclosure, the first processing module 92 is further configured to: when the second network supports the target service, the first network supports to re-direct the terminal to the second network and the terminal supports to be re-directed to the second network, perform the relevant processing on the target service in accordance with the acquired relevant information about the service processing; or when the second network supports the target service and the first network supports the target service through re-directing the terminal to the second network, perform the relevant processing on the target service in accordance with the acquired relevant information about the service processing.

In a possible embodiment of the present disclosure, the first processing module 92 is further configured to perform a first operation or a second operation. The first operation may include determining service support indication information indicating the target service or determining whether the service support indication information about the target service indicates that the target service is to be supported. The second operation may include determining service support information not indicating the target service or determining whether the service support indication information about the target service indicates that the target service is not to be supported.

In a possible embodiment of the present disclosure, the first processing module 92 is further configured to perform the first operation when at least one of the following conditions has been met: the terminal supports the request for preservation of the IP address; the first network and/or second network support preservation of an IP address of the terminal; the first network and/or the second network support preservation of an IP address of the terminal and the terminal supports a request for preservation of the IP address; the terminal supports indicating handover; the second network supports indicating handover; the terminal supports a single-registration mode and indicating handover; the terminal supports a double-registration mode; the terminal is a data-centric terminal; the first network and/or the second network support a procedure of interworking with an N26 interface; and the first network and/or the second network support a procedure of interworking without an N26 interface.

In a possible embodiment of the present disclosure, the first processing module 92 is further configured to perform the first operation when the first network and/or the second network support a procedure of interworking without an N26 interface and at least one of the following conditions has been met: the terminal supports the request for preservation of the IP address, the terminal supports handover attachment, the terminal supports the single-registration mode and the handover attachment, the terminal supports the double-registration mode, and the terminal is the data-centric terminal.

In a possible embodiment of the present disclosure, the first processing module 92 is further configured to perform the second operation when at least one of the following condition has been met: the terminal does not support the request for preservation of the IP address; the first network and/or the second network do not support preservation of an IP address of the terminal; the first network and/or the second network support preservation of an IP address of the terminal but the terminal does not support the request for preservation of the IP address; the terminal is a voice-centric terminal; the first network and/or the second network do not support the procedure of interworking; the first network and/or the second network do not support a procedure of interworking with an N26 interface and do not support a procedure of interworking without an N26 interface; the first network and/or the second network do not support a procedure of interworking without an N26 interface; the first network and/or the second network support a procedure of interworking without an N26 interface but the terminal does not support the handover attachment; the first network and/or the second network support a procedure of interworking without an N26 interface, the terminal is the voice-centric terminal but the terminal does not support the handover attachment; the first network and/or the second network support a procedure of interworking without an N26 interface, the terminal supports the single-registration mode but the terminal does not support the handover attachment; and the first network and/or the second network support a procedure of interworking without an N26 interface, the terminal is the voice-centric terminal, the terminal supports the single-registration mode but the terminal does not support the handover attachment.

The communication device 90 in the embodiments of the present disclosure is capable of implementing the procedures of the method in FIG. 2 with a same technical effect, and thus will not be particularly defined herein.

Figure 10:
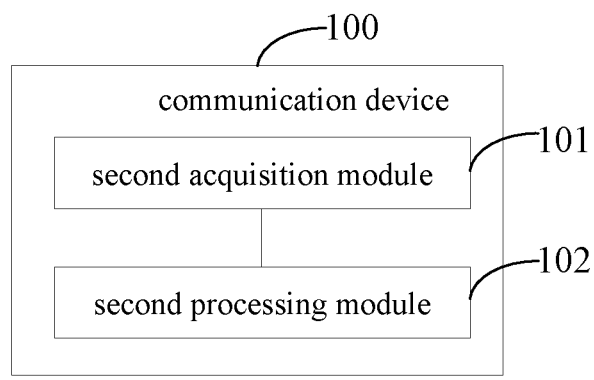
FIG. 10 is a schematic view showing another communication device according to one embodiment of the present disclosure.

As shown in FIG. 10, the present disclosure further provides in some embodiments a communication device 100 which includes: a second acquisition module 101 configured to acquire related information about service processing, the related information about the service processing including at least one of related information indicating whether a terminal supports a request for preservation of an IP address of the terminal, related information indicating whether the first network and/or a second network supports preservation of an IP address of the terminal, related information indicating whether the first network and/or the second network supports a procedure of interworking with an N26 interface, related information indicating whether the first network and/or the second network supports a procedure of interworking without an N26 interface, related information indicating whether the terminal supports indicating handover, related information indicating whether the first network and/or the second network supports preservation of an IP address of the terminal in accordance with the terminal indicating handover, related information about a terminal type, related information about a registration mode of the terminal, related information indicating whether the terminal supports to be re-directed to the second network, related information indicating whether the first network and/or the second network support a target service, related information indicating whether the first network supports to re-direct the terminal to the second network, related information indicating whether the first network supports the target service through re-directing the terminal to the second network; and a second processing module 102 configured to perform relevant processing on the target service at least in accordance with the acquired related information about the service processing, the relevant processing on the target service being relevant processing about access zone selection.

In a possible embodiment of the present disclosure, the second processing module 102 is further configured to: when the second network supports the target service, the first network supports to re-direct the terminal to the second network and the terminal supports to be re-directed to the second network, perform the relevant processing about the access zone selection at least in accordance with the acquired related information about the service processing; or when the second network supports the target service and the first network supports the target service through re-directing the terminal to the second network, perform the relevant processing about the access zone selection at least in accordance with the acquired related information about the service processing.

In a possible embodiment of the present disclosure, the second processing module 102 is further configured to perform a first operation or a second operation. The first operation may include selecting to reside in the first network, and the second operation may include stopping the selection to reside in the first network or and selecting to reside in the second network.

In a possible embodiment of the present disclosure, the second processing module 102 is further configured to perform the first operation when at least one of the following conditions has been met: the terminal supports the request for preservation of the IP address; the first network and/or the second network support preservation of an IP address of the terminal; the first network and/or the second network support preservation of an IP address of the terminal and the terminal supports the request for preservation of the IP address; the terminal supports indicating handover; the second network supports indicating handover; the terminal supports a single-registration mode and indicating handover; the terminal supports a double-registration mode; the terminal is a data-centric terminal; the first network and/or the second network support a procedure of interworking with an N26 interface; and the first network and/or the second network support a procedure of interworking without an N26 interface.

In a possible embodiment of the present disclosure, the second processing module 102 is further configured to perform the first operation when the first network and/or the second network support a procedure of interworking without an N26 interface and at least one of the following conditions has been met: the terminal supports the request for preservation of the IP address; the terminal supports handover attachment; the terminal supports the single-registration mode and the handover attachment; the terminal supports the double-registration mode; and the terminal is the data-centric terminal.

In a possible embodiment of the present disclosure, the second processing module 102 is further configured to perform the second operation when at least one of the following conditions has been met: the terminal does not support the request for preservation of the IP address; the first network and/or the second network do not support preservation of an IP address of the terminal; the first network and/or the second network support preservation of an IP address of the terminal but the terminal does not support the request for preservation of the IP address; the terminal is a voice-centric terminal; the first network and/or the second network do not support the procedure of interworking; the first network and/or the second network do not support a procedure of interworking with an N26 interface and do not support a procedure of interworking without an N26 interface; the first network and/or the second network do not support a procedure of interworking without an N26 interface; the first network and/or the second network support a procedure of interworking without an N26 interface but the terminal does not support handover attachment; the first network and/or the second network support a procedure of interworking without an N26 interface, the terminal is a voice-centric terminal but the terminal does not support the handover attachment; the first network and/or the second network support a procedure of interworking without an N26 interface, the terminal supports the single-registration mode but the terminal does not support the handover attachment; and the first network and/or the second network support a procedure of interworking without an N26 interface, the terminal is the voice-centric terminal, the terminal supports the single-registration mode but the terminal does not support the handover attachment.

The communication device 100 in the embodiments of the present disclosure is capable of implementing the procedures of the method in FIG. 3 with a same technical effect, and thus will not be particularly defined herein.

Figure 11:
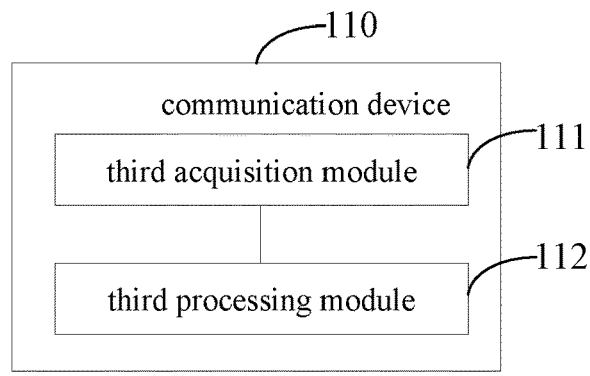
FIG. 11 is a schematic view showing yet another communication device according to one embodiment of the present disclosure.

As shown in FIG. 11, the present disclosure further provides in some embodiments a communication device 110, which includes: a third acquisition module 111 configured to acquire related information about service processing, the related information about the service processing including at least one of related information indicating whether a terminal supports a request for preservation of an IP address of the terminal, related information indicating whether the first network and/or a second network supports preservation of an IP address of the terminal, related information indicating whether the first network and/or the second network supports a procedure of interworking with an N26 interface, related information indicating whether the first network and/or the second network supports a procedure of interworking without an N26 interface, related information indicating whether the terminal supports indicating handover, related information indicating whether the first network and/or the second network supports preservation of an IP address of the terminal in accordance with the terminal indicating handover, related information about a terminal type, related information about a registration mode of the terminal, related information indicating whether the terminal supports to be re-directed to the second network, related information indicating whether the first network and/or the second network support a target service, related information indicating whether the first network supports to re-direct the terminal to the second network, related information indicating whether the first network supports the target service through re-directing the terminal to the second network; and a third processing module 112 configured to perform relevant processing on the target service at least in accordance with the acquired related information about the service processing, the relevant processing on the target service being relevant processing about re-direction.

In a possible embodiment of the present disclosure, the third processing module 112 is further configured to: when the second network supports the target service, the first network supports to re-direct the terminal to the second network and the terminal supports to be re-directed to the second network, perform the relevant processing about the re-direction at least in accordance with the acquired related information about the service processing; or when the second network supports the target service and the first network supports the target service through re-directing the terminal to the second network, perform the relevant processing about the re-direction at least in accordance with the acquired related information about the service processing.

In a possible embodiment of the present disclosure, the third processing module 112 is further configured to perform a first operation or a second operation. The first operation may include re-directing the terminal to the second network for the target service, and the second operation may include maintaining the terminal in the first network for the target service.

In a possible embodiment of the present disclosure, the third processing module 112 is further configured to perform the first operation when at least one of the following conditions has been met: the terminal supports the request for preservation of the IP address; the first network and/or the second network support preservation of an IP address of the terminal; the first network and/or the second network support preservation of an IP address of the terminal and the terminal supports the request for preservation of the IP address; the terminal supports indicating handover; the second network supports indicating handover; the terminal supports a single-registration mode and indicating handover; the terminal supports a double-registration mode; the terminal is a data-centric terminal; the first network and/or the second network support a procedure of interworking with an N26 interface; and the first network and/or the second network support a procedure of interworking without an N26 interface.

In a possible embodiment of the present disclosure, the third processing module 112 is further configured to perform the first operation when the first network and/or the second network support a procedure of interworking without an N26 interface and at least one of the following conditions has been met: the terminal supports the request for preservation of the IP address; the terminal supports handover attachment; the terminal supports the single-registration mode and the handover attachment; the terminal supports the double-registration mode; and the terminal is the data-centric terminal.

In a possible embodiment of the present disclosure, the third processing module 112 is further configured to perform the second operation when at least one of the following conditions has been met: the terminal does not support the request for preservation of the IP address; the first network and/or the second network do not support preservation of an IP address of the terminal; the first network and/or the second network support preservation of an IP address of the terminal but the terminal does not support the request for preservation of the IP address; the terminal is the voice-centric terminal; the first network and/or the second network do not support the procedure of interworking; the first network and/or the second network do not support a procedure of interworking with an N26 interface and do not support a procedure of interworking without an N26 interface; the first network and/or the second network do not support a procedure of interworking without an N26 interface; the first network and/or the second network support a procedure of interworking without an N26 interface but the terminal does not support the handover attachment; the first network and/or the second network support a procedure of interworking without an N26 interface, the terminal is the voice-centric terminal but the terminal does not support the handover attachment; the first network and/or the second network support a procedure of interworking without an N26 interface, the terminal supports the single-registration mode but the terminal does not support the handover attachment; and the first network and/or the second network support a procedure of interworking without an N26 interface, the terminal is the voice-centric terminal, the terminal supports the single-registration mode but the terminal does not support the handover attachment.

The communication device 110 in the embodiments of the present disclosure is capable of implementing the procedures of the method in FIG. 4 with a same technical effect, and thus will not be particularly defined herein.

Figure 12:
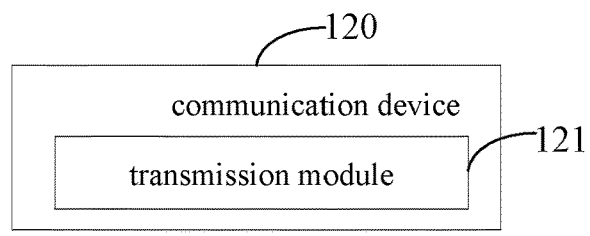
FIG. 12 is a schematic view showing still yet another communication device according to one embodiment of the present disclosure.

As shown in FIG. 12, the present disclosure further provides in some embodiments a communication device 120, which includes a transmission module 121 configured to transmit or broadcast related information about service processing, so as to perform relevant processing about service support indication for a target service, relevant processing about access zone selection, or relevant processing about re-direction for the target service. The related information about the service processing may include at least one of related information indicating whether a terminal supports a request for preservation of an IP address of the terminal, related information indicating whether the first network and/or a second network supports preservation of an IP address of the terminal, related information indicating whether the first network and/or the second network supports a procedure of interworking with an N26 interface, related information indicating whether the first network and/or the second network supports a procedure of interworking without an N26 interface, related information indicating whether the terminal supports indicating handover, related information indicating whether the first network and/or the second network supports preservation of an IP address of the terminal in accordance with the terminal indicating handover, related information about a terminal type, related information about a registration mode of the terminal, related information indicating whether the terminal supports to be re-directed to the second network, related information indicating whether the first network and/or the second network support a target service, related information indicating whether the first network supports to re-direct the terminal to the second network, related information indicating whether the first network supports the target service through re-directing the terminal to the second network.

The communication device 120 in the embodiments of the present disclosure is capable of implementing the procedures of the method in FIG. 5 with a same technical effect, and thus will not be particularly defined herein.

The present disclosure further provides in some embodiments a communication device, which includes a processor, a memory, and a computer program stored in the memory and executed by the processor. The processor is configured to execute the computer program so as to implement the above-mentioned service processing methods with a same technical effect, which will thus not be particularly defined herein.

The present disclosure further provides in some embodiments a communication device, including a processor, a memory, and a computer program stored in the memory and executed by the processor. The processor is configured to execute the computer program so as to implement the above-mentioned information transmission method with a same technical effect, which will thus not be particularly defined herein.

The present disclosure further provides in some embodiments a computer-readable storage medium storing therein a computer program. The computer program is executed by a processor, so as to implement the above-mentioned service processing methods with a same technical effect, which will thus not be particularly defined herein.

The present disclosure further provides in some embodiments a computer-readable storage medium storing therein a computer program. The computer program is executed by a processor, so as to implement the above-mentioned information transmission method with a same technical effect, which will thus not be particularly defined herein.

Figure 13:
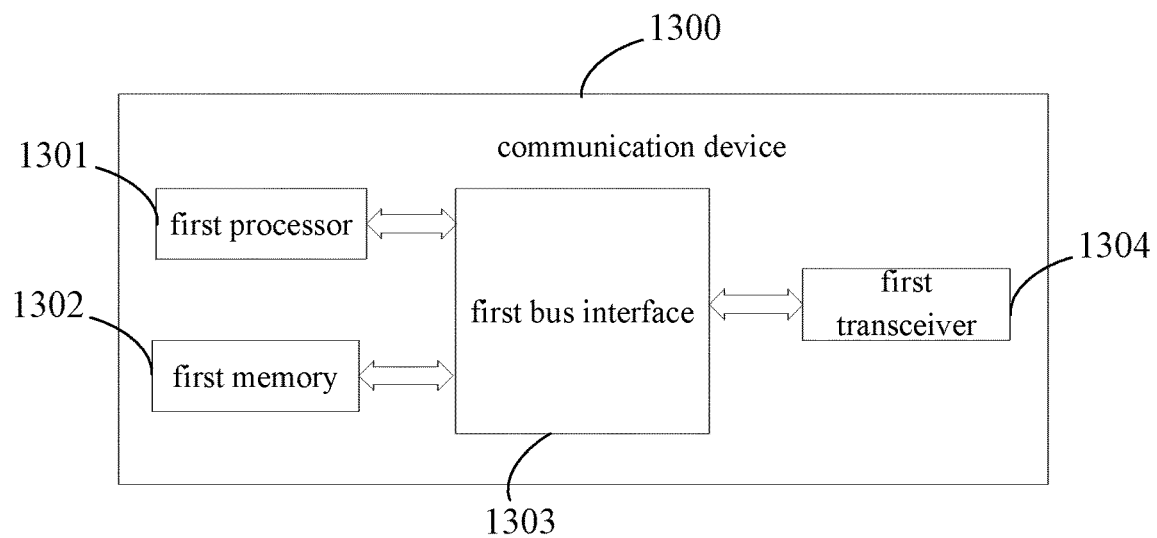
FIG. 13 is another schematic view showing the communication device according to one embodiment of the present disclosure.

As shown in FIG. 13, the present disclosure further provides in some embodiments a communication device 1300, which includes a first processor 1301, a first memory 1302, a first bus interface 1303 and a first transceiver 1304. The first processor 1301, the first memory 1302 and the first transceiver 1304 may be coupled to the first bus interface 1303.

The first processor 1301 is configured to: acquire related information about service processing, the related information about the service processing including at least one of related information indicating whether a terminal supports a request for preservation of an IP address of the terminal, related information indicating whether the first network and/or a second network supports preservation of an IP address of the terminal, related information indicating whether the first network and/or the second network supports a procedure of interworking with an N26 interface, related information indicating whether the first network and/or the second network supports a procedure of interworking without an N26 interface, related information indicating whether the terminal supports indicating handover, related information indicating whether the first network and/or the second network supports preservation of an IP address of the terminal in accordance with the terminal indicating handover, related information about a terminal type, related information about a registration mode of the terminal, related information indicating whether the terminal supports to be re-directed to the second network, related information indicating whether the first network and/or the second network support a target service, related information indicating whether the first network supports to re-direct the terminal to the second network, related information indicating whether the first network supports the target service through re-directing the terminal to the second network; and perform relevant processing on the target service at least in accordance with the acquired related information about the service processing, the relevant processing on the target service being relevant processing about service support indication.

In a possible embodiment of the present disclosure, the first processor 1301 is further configured to: when the second network supports the target service, the first network supports to re-direct the terminal to the second network and the terminal supports to be re-directed to the second network, perform the relevant processing on the target service in accordance with the acquired relevant information about the service processing; or when the second network supports the target service and the first network supports the target service through re-directing the terminal to the second network, perform the relevant processing on the target service in accordance with the acquired relevant information about the service processing.

In a possible embodiment of the present disclosure, the first processor 1301 is further configured to: perform a first operation or a second operation. The first operation may include determining service support indication information indicating the target service or determining whether the service support indication information about the target service indicates that the target service is to be supported. The second operation may include determining service support information not indicating the target service or determining whether the service support indication information about the target service indicates that the target service is not to be supported.

In a possible embodiment of the present disclosure, the first processor 1301 is further configured to perform the first operation when at least one of the following conditions has been met: the terminal supports the request for preservation of the IP address; the first network and/or second network support preservation of an IP address of the terminal; the first network and/or the second network support preservation of an IP address of the terminal and the terminal supports a request for preservation of the IP address; the terminal supports indicating handover; the second network supports indicating handover; the terminal supports a single-registration mode and indicating handover; the terminal supports a double-registration mode; the terminal is a data-centric terminal; the first network and/or the second network support a procedure of interworking with an N26 interface; and the first network and/or the second network support a procedure of interworking without an N26 interface.

In a possible embodiment of the present disclosure, the first processor 1301 is further configured to perform the first operation when the first network and/or the second network support a procedure of interworking without an N26 interface and at least one of the following conditions has been met: the terminal supports the request for preservation of the IP address, the terminal supports handover attachment, the terminal supports the single-registration mode and the handover attachment, the terminal supports the double-registration mode, and the terminal is the data-centric terminal.

In a possible embodiment of the present disclosure, the first processor 1301 is further configured to perform the second operation when at least one of the following condition has been met: the terminal does not support the request for preservation of the IP address; the first network and/or the second network do not support preservation of an IP address of the terminal; the first network and/or the second network support preservation of an IP address of the terminal but the terminal does not support the request for preservation of the IP address; the terminal is a voice-centric terminal; the first network and/or the second network do not support the procedure of interworking; the first network and/or the second network do not support a procedure of interworking with an N26 interface and do not support a procedure of interworking without an N26 interface; the first network and/or the second network do not support a procedure of interworking without an N26 interface; the first network and/or the second network support a procedure of interworking without an N26 interface but the terminal does not support the handover attachment; the first network and/or the second network support a procedure of interworking without an N26 interface, the terminal is the voice-centric terminal but the terminal does not support the handover attachment; the first network and/or the second network support a procedure of interworking without an N26 interface, the terminal supports the single-registration mode but the terminal does not support the handover attachment; and the first network and/or the second network support a procedure of interworking without an N26 interface, the terminal is the voice-centric terminal, the terminal supports the single-registration mode but the terminal does not support the handover attachment.

Figure 14:
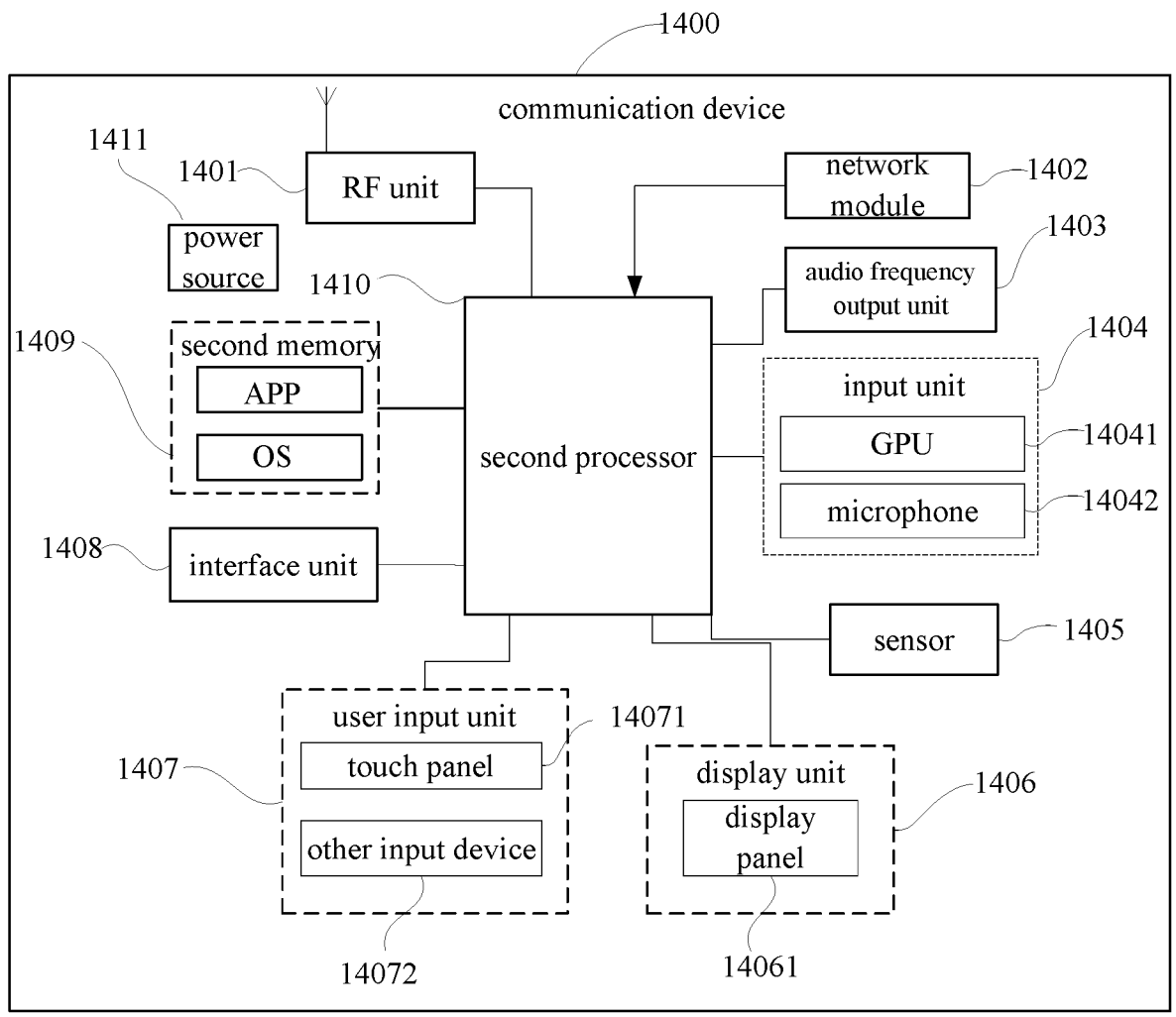
FIG. 14 is a schematic view showing a hardware structure of the communication device according to one embodiment of the present disclosure.

As shown in FIG. 14, the present disclosure further provides in some embodiments a communication device 1400 which includes, but not limited to, a radio frequency unit 1401, a network module 1402, an audio frequency output unit 1403, an input unit 1404, a sensor 1405, a display unit 1406, a user input unit 1407, an interface unit 1408, a second memory 1409, a second processor 1410, and a power source 1411. It should be appreciated that, the communication device may not be limited thereto, i.e., it may include more or fewer members, or some members may be combined, or the members may be arranged in different modes. In the embodiments of the present disclosure, the communication device may include, but not limited to, mobile phone, flat-panel computer, laptop computer, personal digital assistant, vehicle-mounted terminal, wearable electronic device or pedometer.

The second processor 1401 is configured to: acquire related information about service processing, the related information about the service processing including at least one of related information indicating whether a terminal supports a request for preservation of an IP address of the terminal, related information indicating whether the first network and/or a second network supports preservation of an IP address of the terminal, related information indicating whether the first network and/or the second network supports a procedure of interworking with an N26 interface, related information indicating whether the first network and/or the second network supports a procedure of interworking without an N26 interface, related information indicating whether the terminal supports indicating handover, related information indicating whether the first network and/or the second network supports preservation of an IP address of the terminal in accordance with the terminal indicating handover, related information about a terminal type, related information about a registration mode of the terminal, related information indicating whether the terminal supports to be re-directed to the second network, related information indicating whether the first network and/or the second network support a target service, related information indicating whether the first network supports to re-direct the terminal to the second network, related information indicating whether the first network supports the target service through re-directing the terminal to the second network; and perform relevant processing on the target service at least in accordance with the acquired related information about the service processing, the relevant processing on the target service being relevant processing about access zone selection.

In a possible embodiment of the present disclosure, the second processor 1410 is further configured to: when the second network supports the target service, the first network supports to re-direct the terminal to the second network and the terminal supports to be re-directed to the second network, perform the relevant processing about the access zone selection at least in accordance with the acquired related information about the service processing; or when the second network supports the target service and the first network supports the target service through re-directing the terminal to the second network, perform the relevant processing about the access zone selection at least in accordance with the acquired related information about the service processing.

In a possible embodiment of the present disclosure, the second processor 1410 is further configured to perform a first operation or a second operation. The first operation may include selecting to reside in the first network, and the second operation may include stopping the selection to reside in the first network or and selecting to reside in the second network.

In a possible embodiment of the present disclosure, the second processor 1410 is further configured to perform the first operation when at least one of the following conditions has been met: the terminal supports the request for preservation of the IP address; the first network and/or the second network support preservation of an IP address of the terminal; the first network and/or the second network support preservation of an IP address of the terminal and the terminal supports the request for preservation of the IP address; the terminal supports indicating handover; the second network supports indicating handover; the terminal supports a single-registration mode and indicating handover; the terminal supports a double-registration mode; the terminal is a data-centric terminal; the first network and/or the second network support a procedure of interworking with an N26 interface; and the first network and/or the second network support a procedure of interworking without an N26 interface.

In a possible embodiment of the present disclosure, the second processor 1410 is further configured to perform the first operation when the first network and/or the second network support a procedure of interworking without an N26 interface and at least one of the following conditions has been met: the terminal supports the request for preservation of the IP address; the terminal supports handover attachment; the terminal supports the single-registration mode and the handover attachment; the terminal supports the double-registration mode; and the terminal is the data-centric terminal.

In a possible embodiment of the present disclosure, the second processor 1410 is further configured to perform the second operation when at least one of the following conditions has been met: the terminal does not support the request for preservation of the IP address; the first network and/or the second network do not support preservation of an IP address of the terminal; the first network and/or the second network support preservation of an IP address of the terminal but the terminal does not support the request for preservation of the IP address; the terminal is a voice-centric terminal; the first network and/or the second network do not support the procedure of interworking; the first network and/or the second network do not support a procedure of interworking with an N26 interface and do not support a procedure of interworking without an N26 interface; the first network and/or the second network do not support a procedure of interworking without an N26 interface; the first network and/or the second network support a procedure of interworking without an N26 interface but the terminal does not support handover attachment; the first network and/or the second network support a procedure of interworking without an N26 interface, the terminal is a voice-centric terminal but the terminal does not support the handover attachment; the first network and/or the second network support a procedure of interworking without an N26 interface, the terminal supports the single-registration mode but the terminal does not support the handover attachment; and the first network and/or the second network support a procedure of interworking without an N26 interface, the terminal is the voice-centric terminal, the terminal supports the single-registration mode but the terminal does not support the handover attachment.

It should be appreciated that, in the embodiments of the present disclosure, the radio frequency unit 1401 is configured to transmit and receive signals during the information transmission or phone call. To be specific, the radio frequency unit 1401 may, upon the receipt of downlink data from a base station, transmit the downlink data to the second processor 1410 for subsequent treatment. In addition, the radio frequency unit 1401 may transmit uplink data to the base station. Usually, the radio frequency unit 1401 may include, but not limited to, an antenna, at least one amplifier, a transceiver, a coupler, a low-noise amplifier and a duplexer. In addition, the radio frequency unit 1401 may communicate with a network and the other devices via a wireless communications system.

The network module 1402 is configured to enable the user to access the broadband Internet in a wireless manner, e.g., help the user to receive and send an e-mail, browse a web or access a streaming media.

The audio frequency output unit 1403 is configured to convert audio data received by the radio frequency unit 1401 or the network module 1402, or audio data stored in the second memory 1409, into an audio signal and output the audio signal as a sound. In addition, the audio frequency output unit 1403 is further configured to provide an audio output related to a specific function executed by the communication device 1400 (e.g., a sound occurring when a calling signal or a message has been received). The audio frequency output unit 1403 may include a loudspeaker, a buzzer and a receiver.

The input unit 1404 is configured to receive an audio or video signal. It may include a graphics processing unit (Graphics Processing Unit, GPU) 14041 and a microphone 14042. The GPU 14041 is configured to process image data of a static image or video acquired by an image collection unit (e.g., a camera) in a video capturing mode or an image capturing mode, and a processed image frame may be displayed by the display unit 1406. The image frame processed by the GPU 14041 may be stored in the second memory 1409 (or any other storage medium) or transmitted via the radio frequency unit 1401 or network module 1402. The microphone 14042 is configured to receive a sound, and convert the sound into voice data. In a call mode, the processed audio data may be converted into data in a format capable of being transmitted by the radio frequency unit 1401 to a mobile communication base station.

The at least one sensor 1405 may include a light sensor, a movement sensor and the other sensors. To be specific, the light sensor may include an ambient light sensor or a proximity sensor. The ambient light sensor is configured to adjust a brightness value of a display panel 14061 in accordance with ambient light. The proximity sensor is configured to turn off the display panel 14061 and/or a backlight source when the communication device 1400 moves close to an ear. As one of the movement sensors, an accelerometer may detect acceleration in various directions (usually a three-axis accelerometer), and detect a level and a direction of a gravity force when in a static state. Through the accelerometer, it is able to identify a posture of the communication device (e.g., perform a switching operation between portrait and landscape orientations, play relevant games, and calibrate a posture of a magnetometer), and perform vibration-related functions (e.g., count steps and strikes). The sensor 1405 may further include a fingerprint sensor, a pressure sensor, an iris sensor, a molecule sensor, a gyroscope, a barometer, a hygrometer, a thermometer or an infrared sensor, which will not be particularly defined herein.

The display unit 1406 is configured to display information inputted by the user or provided to the user. The display unit 1406 may include the display panel 14061, e.g., a liquid crystal display (Liquid Crystal Display, LCD) panel, or an organic light-emitting diode (Organic Light-Emitting Diode, OLED) panel.

The user input unit 1407 is configured to receive digital or character information inputted by the user, and generate a key signal input related to user settings and function control of the communication device. To be specific, the user input unit 1407 may include a touch panel 14071 and an input device 14072. The touch panel 14071, also called as touch screen, is configured to collect a touch operation made by the user on or in proximity to the touch panel (e.g., an operation made by the user through any appropriate object or attachment (e.g., finger or stylus) on or in the proximity to the touch panel 14071). The touch panel 14071 may include a touch detection unit and a touch controller. The touch detection unit is configured to detect a touch position and a signal generated due to the touch operation, and transmit the signal to the touch controller. The touch controller is configured to receive touch information from the touch detection unit, convert it into coordinates of a touch point, transmit the coordinates to the second processor 1410, and receive and execute a command from the second processor 1410. In addition, the touch panel 14071 may be of a resistive type, a capacitive type, an infrared type or a surface acoustic wave (SAW) type. The other input device 14072 may include, but not limited to, a physical keyboard, a functional button (e.g., a volume control button or an on/off button), a trackball, a mouse, and a joystick, which will not be particularly defined herein.

Further, the touch panel 14071 may cover the display panel 14061. When the touch operation made on or in proximity to the touch panel 14071 has been detected, the touch panel 14071 may transmit the touch information to the second processor 1410, so as to determine a type of a touch event. Then, the second processor 1410 may control the display panel 14061 to provide a corresponding visual output in accordance with the type of the touch event. Although the touch panel 14071 and the display panel 14061 are configured as two separate members in FIG. 14, in some embodiments of the present disclosure, they may be integrated so as to achieve the input and output functions of the communication device, which will not be particularly defined herein.

The interface unit 1408 is configured to provide an interface between an external device and the communication device 1400. For example, the external device may include a wired or wireless headset port, an external power source port (or a charging port), a wired or wireless data port, a memory card port, a port for a device having an identification module, an audio input/output (I/O) port, a video I/O port, and an earphone port. The interface unit 1408 is configured to receive an input from the external device (e.g., data information and electricity) and transmit the input to one or more elements of the communication device 1400, or transmit data between the communication device 1400 and the external device.

The second memory 1409 is configured to store therein a software application and various data. It may mainly include an application storage area and a data storage area. An operating system and at least one application for the functions (e.g., an audio/image playing function) may be stored in the application storage area. Data created in accordance with the operation of the mobile phone (e.g., audio data and textbook) may be stored in the data storage area. In addition, the second memory 1409 may include a high-speed random access memory, or a non-volatile memory (e.g., at least one magnetic disk or flash memory), or any other volatile solid state memory.

As a control center of the communication device, the second processor 1410 may be connected to the other members of the communication device via various interfaces and circuits, and configured to run or execute the software program and/or module stored in the second memory 1409, and call the data stored in the second memory 1409, so as to execute the functions of the communication device and process the data, thereby to monitor the entire communication device. The second processor 1410 may include one or more processing units. In a possible embodiment of the present disclosure, an application processor and a modem may be integrated into the second processor 1410. The application processor is mainly configured to process the operating system, a user interface and the application. The modem is mainly configured to process wireless communication. It should be appreciated that, the modem may also not be integrated into the second processor 1410.

The power source 1411 (e.g., a battery) is configured to supply power to the members of the communication device 1400. In a possible embodiment of the present disclosure, the power source 1411 is logically connected to the second processor 1410 via a power source management system, so as to achieve such functions as charging, discharging and power consumption management through the power source management system.

In addition, the communication device 1400 may include some functional modules not shown in FIG. 14, which will not be particularly defined herein.

Figure 15:
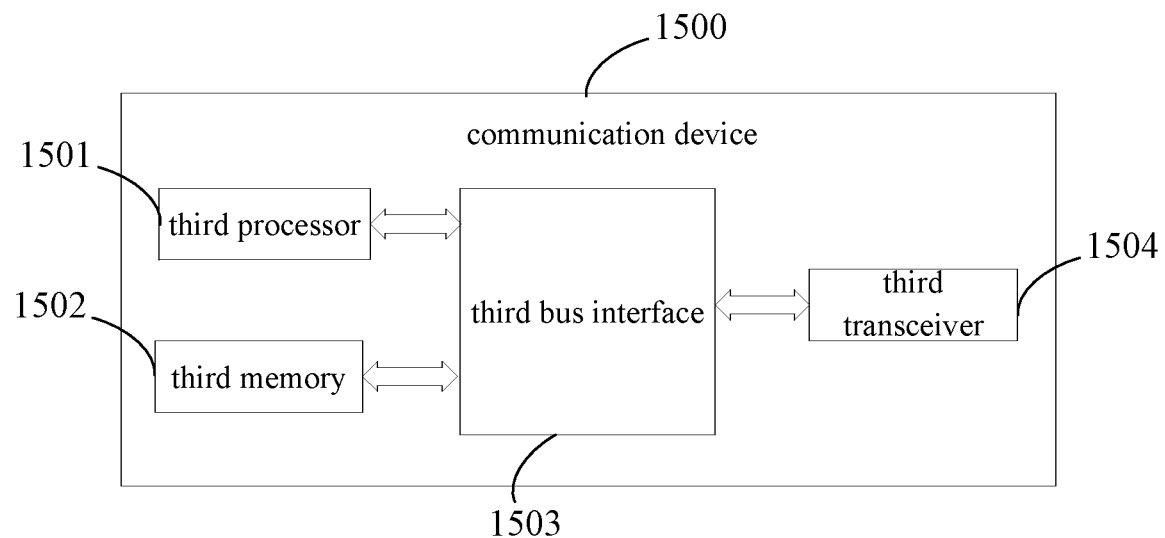
FIG. 15 is another schematic view showing the communication device according to one embodiment of the present disclosure.

As shown in FIG. 15, the present disclosure further provides in some embodiments a communication device 1500, which includes a third processor 1501, a third memory 1502, a third bus interface 1503 and a third transceiver 1504. The third processor 1501, the third memory 1502 and the third transceiver 1504 may be coupled to the third bus interface 1503.

The third processor 1501 is configured to: acquire related information about service processing, the related information about the service processing including at least one of related information indicating whether a terminal supports a request for preservation of an IP address of the terminal, related information indicating whether the first network and/or a second network supports preservation of an IP address of the terminal, related information indicating whether the first network and/or the second network supports a procedure of interworking with an N26 interface, related information indicating whether the first network and/or the second network supports a procedure of interworking without an N26 interface, related information indicating whether the terminal supports indicating handover, related information indicating whether the first network and/or the second network supports preservation of an IP address of the terminal in accordance with the terminal indicating handover, related information about a terminal type, related information about a registration mode of the terminal, related information indicating whether the terminal supports to be re-directed to the second network, related information indicating whether the first network and/or the second network support a target service, related information indicating whether the first network supports to re-direct the terminal to the second network, related information indicating whether the first network supports the target service through re-directing the terminal to the second network; and perform relevant processing on the target service at least in accordance with the acquired related information about the service processing, the relevant processing on the target service being relevant processing about re-direction.

In a possible embodiment of the present disclosure, the third processor 1501 is further configured to: when the second network supports the target service, the first network supports to re-direct the terminal to the second network and the terminal supports to be re-directed to the second network, perform the relevant processing about the re-direction at least in accordance with the acquired related information about the service processing; or when the second network supports the target service and the first network supports the target service through re-directing the terminal to the second network, perform the relevant processing about the re-direction at least in accordance with the acquired related information about the service processing.

In a possible embodiment of the present disclosure, the third processor 1501 is further configured to perform a first operation or a second operation. The first operation may include re-directing the terminal to the second network for the target service, and the second operation may include maintaining the terminal in the first network for the target service.

In a possible embodiment of the present disclosure, the third processor 1501 is further configured to perform the first operation when at least one of the following conditions has been met: the terminal supports the request for preservation of the IP address; the first network and/or the second network support preservation of an IP address of the terminal; the first network and/or the second network support preservation of an IP address of the terminal and the terminal supports the request for preservation of the IP address; the terminal supports indicating handover; the second network supports indicating handover; the terminal supports a single-registration mode and indicating handover; the terminal supports a double-registration mode; the terminal is a data-centric terminal; the first network and/or the second network support a procedure of interworking with an N26 interface; and the first network and/or the second network support a procedure of interworking without an N26 interface.

In a possible embodiment of the present disclosure, the third processor 1501 is further configured to perform the first operation when the first network and/or the second network support a procedure of interworking without an N26 interface and at least one of the following conditions has been met: the terminal supports the request for preservation of the IP address; the terminal supports handover attachment; the terminal supports the single-registration mode and the handover attachment; the terminal supports the double-registration mode; and the terminal is the data-centric terminal.

In a possible embodiment of the present disclosure, the third processor 1501 is further configured to perform the second operation when at least one of the following conditions has been met: the terminal does not support the request for preservation of the IP address; the first network and/or the second network do not support preservation of an IP address of the terminal; the first network and/or the second network support preservation of an IP address of the terminal but the terminal does not support the request for preservation of the IP address; the terminal is the voice-centric terminal; the first network and/or the second network do not support the procedure of interworking; the first network and/or the second network do not support a procedure of interworking with an N26 interface and do not support a procedure of interworking without an N26 interface; the first network and/or the second network do not support a procedure of interworking without an N26 interface; the first network and/or the second network support a procedure of interworking without an N26 interface but the terminal does not support the handover attachment; the first network and/or the second network support a procedure of interworking without an N26 interface, the terminal is the voice-centric terminal but the terminal does not support the handover attachment; the first network and/or the second network support a procedure of interworking without an N26 interface, the terminal supports the single-registration mode but the terminal does not support the handover attachment; and the first network and/or the second network support a procedure of interworking without an N26 interface, the terminal is the voice-centric terminal, the terminal supports the single-registration mode but the terminal does not support the handover attachment.

Figure 16:
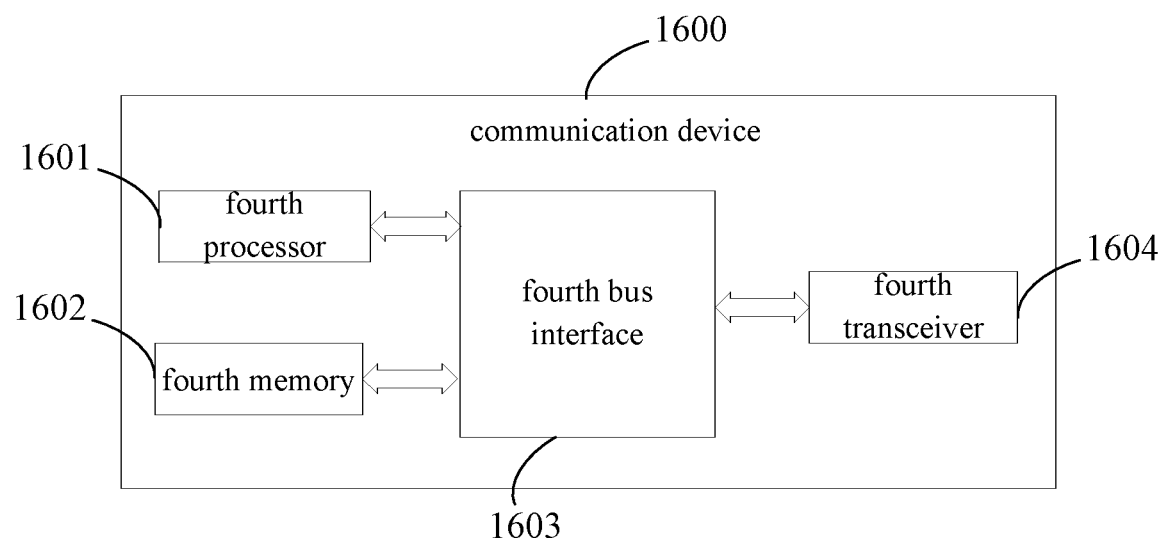
FIG. 16 is another schematic view showing the communication device according to one embodiment of the present disclosure.

As shown in FIG. 16, the present disclosure further provides in some embodiments a communication device 1600 which includes a fourth processor 1601, a fourth memory 1602, a fourth bus interface 1603 and a fourth transceiver 1604. The fourth processor 1601, the fourth memory 1602 and the fourth transceiver 1604 may be coupled to the fourth bus interface 1603.

The fourth transceiver 1604 is configured to transmit or broadcast related information about service processing, so as to perform relevant processing about service support indication for a target service, relevant processing about access zone selection, or relevant processing about re-direction for the target service. The related information about the service processing may include at least one of related information indicating whether a terminal supports a request for preservation of an IP address of the terminal, related information indicating whether the first network and/or a second network supports preservation of an IP address of the terminal, related information indicating whether the first network and/or the second network supports a procedure of interworking with an N26 interface, related information indicating whether the first network and/or the second network supports a procedure of interworking without an N26 interface, related information indicating whether the terminal supports indicating handover, related information indicating whether the first network and/or the second network supports preservation of an IP address of the terminal in accordance with the terminal indicating handover, related information about a terminal type, related information about a registration mode of the terminal, related information indicating whether the terminal supports to be re-directed to the second network, related information indicating whether the first network and/or the second network support a target service, related information indicating whether the first network supports to re-direct the terminal to the second network, related information indicating whether the first network supports the target service through re-directing the terminal to the second network.

It should be appreciated that, such words as "include" or "including" or any other variations involved in the present disclosure intend to provide non-exclusive coverage, so that a procedure, method, article or device including a series of elements may also include any other elements not listed herein, or may include any inherent elements of the procedure, method, article or device. If without any further limitations, for the elements defined by such sentence as "including one . . . ", it is not excluded that the procedure, method, article or device including the elements may also include any other identical elements.

Through the above-mentioned description, it may be apparent for a person skilled in the art that the present disclosure may be implemented by software as well as a necessary common hardware platform, or by hardware, and the former may be better in most cases. Based on this, the technical solutions of the present disclosure, partial or full, or parts of the technical solutions of the present disclosure contributing to the related art, may appear in the form of software products, which may be stored in a storage medium (e.g., ROM/RAM, magnetic disk or optical disk) and include several instructions so as to enable a terminal device (mobile phone, computer, server, air conditioner or network device) to execute the method in the embodiments of the present disclosure.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A service processing method performed by a terminal, the service processing method comprising:
transmitting related information about service processing to a first network unit in a first network, wherein the first network unit in the first network is an Access Management Function (AMF) or Mobility Management Entity (MME), so as to perform relevant processing on a target service, wherein the related information about the service processing comprises at least one of: related information indicating whether the terminal supports handover attach, or related information indicating whether the first network and/or the second network supports preservation of an IP address of the terminal in accordance with the terminal indicating handover, wherein the related information indicating whether the terminal supports handover attach refers to information indicating that the terminal supports to indicate the request type in a Protocol Data Unit (PDU) connection request as handover; and
receiving service support indication information from the first network unit in the first network, wherein the service support indication information is determined in accordance with the related information about service processing, wherein the service support indication information is used to indicate whether the target service is to be supported or the target service is not to be supported; or
receiving or not receiving a service support indicator for a target service from the first network unit in the first network, wherein whether the service support indicator is transmitted or not is determined in accordance with the related information about service processing, wherein the target service comprises voice service or emergency service.

2. The service processing method according to claim 1, wherein the transmitting related information about service processing to the first network unit in the first network comprises:
transmitting a registration request message to the first network unit in the first network, wherein the registration request message comprises the related information about service processing; and
wherein the receiving service support indication information from the first network unit in the first network comprises:
receiving a registration acceptance message from the first network unit in the first network, wherein the registration acceptance message comprises the service support indication information.

3. The service processing method according to claim 1, wherein the related information indicating whether the terminal supports handover attach comprises related information indicating that the terminal supports handover attach;
wherein the terminal supports handover attach when at least one of the following conditions has been met: the terminal supports to initiate handover attach, the terminal supports to initiate location update for indicating handover attach, or the terminal supports to indicate the request type in the PDU connection request as handover, or
wherein the terminal supports handover attach when the terminal has one of a capability that the terminal supports the request for preservation of the IP address of the terminal when the terminal moves from the first network to the second network, or a capability that the terminal supports to indicate the request type in a PDU connectivity establishment request as handover in an attach request process or location update request process when the terminal moves from a $5^{th}$-Generation (5G) network to an Evolved Packet System (EPS) network.

4. The service processing method according to claim 1, wherein the handover attach comprises indicating the request for preservation of the IP address of the terminal when the terminal moves from the first network to the second network.

5. The service processing method according to claim 1, wherein whether the first network and/or the second network support preservation of an IP address of the terminal in accordance with the terminal indicating handover comprises whether the first network and/or the second network support handover attach.

6. The service processing method according to claim 1, wherein the target service comprises an IP Multimedia Subsystem (IMS) voice service.

7. The service processing method according to claim 1, wherein the service support indicator comprises one of an IMS voice over Packet Switching (PS) session supported indicator or an IMS voice over PS session supported indicator over $3^{rd}$-Generation Partnership Project (3GPP).

8. The service processing method according to claim 1, wherein the related information about the service processing further comprises at least one of: related information indicating whether the terminal supports a request for preservation of an Internet Protocol (IP) address of the terminal, related information indicating whether the first network and/or the second network supports preservation of an IP address of the terminal, related information indicating whether the first network and/or the second network supports a procedure of interworking with an N26 interface, related information indicating whether the first network and/or the second network supports a procedure of interworking without an N26 interface, related information indicating whether the terminal supports to be re-directed to the second network, related information indicating whether the first network and/or the second network support a target service, related information indicating whether the first network supports to re-direct the terminal to the second network, or related information indicating whether the first network supports the target service through re-directing the terminal to the second network.

9. A terminal, comprising a processor, a memory, and a computer program stored in the memory and executed by the processor, wherein the processor is configured to execute the computer program to perform operations comprising:
transmitting related information about service processing to a first network unit in a first network, wherein the first network unit in the first network is an Access Management Function (AMF) or Mobility Management Entity (MME), so as to perform relevant processing on a target service, wherein the related information about the service processing comprises at least one of: related information indicating whether the terminal supports handover attach, or related information indicating whether the first network and/or the second network supports preservation of an IP address of the terminal in accordance with the terminal indicating handover, wherein the related information indicating whether the terminal supports handover attach refers to information indicating that the terminal supports to indicate the request type in a Protocol Data Unit (PDU) connection request as handover; and
receiving service support indication information from the first network unit in the first network, wherein the service support indication information is determined in accordance with the related information about service processing, wherein the service support indication information is used to indicate whether the target service is to be supported or the target service is not to be supported; or
receiving or not receiving a service support indicator for a target service from the first network unit in the first network, wherein whether the service support indicator is transmitted or not is determined in accordance with the related information about service processing,
wherein the target service comprises voice service or emergency service.

10. The terminal according to claim 9, wherein the transmitting related information about service processing comprises:
transmitting a registration request message, wherein the registration request message comprises the related information about service processing; and
wherein the receiving service support indication information from the first network unit in the first network comprises:
receiving a registration acceptance message from the first network unit in the first network, wherein the registration acceptance message comprises the service support indication information.

11. The terminal according to claim 9, wherein the related information indicating whether the terminal supports handover attach comprises related information indicating that the terminal supports handover attach;

wherein the terminal supports handover attach when at least one of the following conditions has been met: the terminal supports to initiate handover attach, the terminal supports to initiate location update for indicating handover attach, or the terminal supports to indicate the request type in the PDU connection request as handover, or wherein the terminal supports handover attach when the terminal has one of a capability that the terminal supports the request for preservation of the IP address of the terminal when the terminal moves from the first network to the second network, or a capability that the terminal supports to indicate the request type in a PDU connectivity establishment request as handover in an attach request process or location update request process when the terminal moves from a $5^{th}$-Generation (5G) network to an Evolved Packet System (EPS) network.

12. The terminal according to claim 9, wherein the handover attach comprises indicating the request for preservation of the IP address of the terminal when the terminal moves from the first network to the second network.

13. The terminal according to claim 9, wherein whether the first network and/or the second network support preservation of an IP address of the terminal in accordance with the terminal indicating handover comprises whether the first network and/or the second network support handover attach.

14. The terminal according to claim 9, wherein the target service comprises an IP Multimedia Subsystem (IMS) voice service, and wherein the service support indicator comprises one of an IMS voice over Packet Switching (PS) session supported indicator or an IMS voice over PS session supported indicator over $3^{rd}$-Generation Partnership Project (3GPP).

15. The terminal according to claim 8, wherein the related information about the service processing further comprises at least one of: related information indicating whether the terminal supports a request for preservation of an Internet Protocol (IP) address of the terminal, related information indicating whether the first network and/or the second network supports preservation of an IP address of the terminal, related information indicating whether the first network and/or the second network supports a procedure of interworking with an N26 interface, related information indicating whether the first network and/or the second network supports a procedure of interworking without an N26 interface, related information indicating whether the terminal supports to be re-directed to the second network, related information indicating whether the first network and/or the second network support a target service, related information indicating whether the first network supports to re-direct the terminal to the second network, or related information indicating whether the first network supports the target service through re-directing the terminal to the second network.

16. A non-transitory computer-readable storage medium, storing a computer program, when the computer program is executed by a processor of a terminal, the terminal is enabled to perform the following operations:

transmitting related information about service processing to a first network unit in a first network, wherein the first network unit in the first network is an Access Management Function (AMF) or Mobility Management Entity (MME), so as to perform relevant processing on a target service, wherein the related information about the service processing comprises at least one of: related information indicating whether the terminal supports handover attach, or related information indicating whether the first network and/or the second network supports preservation of an IP address of the terminal in accordance with the terminal indicating handover, wherein the related information indicating whether the terminal supports handover attach refers to information indicating that the terminal supports to indicate the request type in a Protocol Data Unit (PDU) connection request as handover; and receiving service support indication information from the first network unit in the first network, wherein the service support indication information is determined in accordance with the related information about service processing, wherein the service support indication information is used to indicate whether the target service is to be supported or the target service is not to be supported; or receiving or not receiving a service support indicator for a target service from the first network unit in the first network, wherein whether the service support indicator is transmitted or not is determined in accordance with the related information about service processing, wherein the target service comprises voice service or emergency service.

17. The non-transitory computer-readable storage medium according to claim 16, wherein the transmitting related information about service processing comprises:

transmitting a registration request message, wherein the registration request message comprises the related information about service processing; and wherein the receiving service support indication information from the first network unit in the first network comprises:

receiving a registration acceptance message from the first network unit in the first network, wherein the registration acceptance message comprises the service support indication information.

18. The non-transitory computer-readable storage medium according to claim 16, wherein the related information indicating whether the terminal supports handover attach comprises related information indicating that the terminal supports handover attach;

wherein the terminal supports handover attach when at least one of the following conditions has been met: the terminal supports to initiate handover attach, the terminal supports to initiate location update for indicating handover attach, or the terminal supports to indicate the request type in the PDU connection request as handover, or wherein the terminal supports handover attach when the terminal has one of a capability that the terminal supports the request for preservation of the IP address of the terminal when the terminal moves from the first network to the second network, or a capability that the terminal supports to indicate the request type in a PDU connectivity establishment request as handover in an attach request process or location update request process when the terminal moves from a $5^{th}$-Generation (5G) network to an Evolved Packet System (EPS) network.

19. The non-transitory computer-readable storage medium according to claim 16, wherein the handover attach comprises indicating the request for preservation of the IP address of the terminal when the terminal moves from the first network to the second network.

20. The non-transitory computer-readable storage medium according to claim 16, wherein the target service comprises an IP Multimedia Subsystem (IMS) voice service, wherein the service support indicator comprises one of an IMS voice over Packet Switching (PS) session supported indicator or an IMS voice over PS session supported indicator over $3^{rd}$-Generation Partnership Project (3GPP).

* * * * *